(12) United States Patent
Kirsch

(10) Patent No.: US 11,012,240 B1
(45) Date of Patent: *May 18, 2021

(54) METHODS AND SYSTEMS FOR DEVICE AUTHENTICATION

(71) Applicant: Neustar, Inc., Sterling, VA (US)

(72) Inventor: Steven Todd Kirsch, Los Altos Hills, CA (US)

(73) Assignee: Neustar, Inc., Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,990

(22) Filed: Jun. 7, 2018

Related U.S. Application Data

(63) Continuation of application No. 15/155,264, filed on May 16, 2016, now abandoned, which is a
(Continued)

(51) Int. Cl.
  *G06F 21/00* (2013.01)
  *H04L 9/32* (2006.01)
  (Continued)

(52) U.S. Cl.
  CPC ............ *H04L 9/3247* (2013.01); *G06F 21/31* (2013.01); *G06F 21/335* (2013.01); *H04L 9/14* (2013.01);
  (Continued)

(58) Field of Classification Search
  CPC ... H04L 63/08; H04L 63/083; H04L 63/0869; H04L 63/10; H04L 9/3247; H04L 9/14;
  (Continued)

(56) References Cited

U.S. PATENT DOCUMENTS

| | | | | |
|---|---|---|---|---|
| 5,495,235 A | * | 2/1996 | Durinovic-Johri | ...... G07C 9/33 340/5.27 |
| 5,550,968 A | * | 8/1996 | Miller | ................... G06F 3/0481 715/741 |

(Continued)

FOREIGN PATENT DOCUMENTS

| | | |
|---|---|---|
| EP | 0683582 A1 | 11/1995 |
| KR | 20130083619 A | 7/2013 |

OTHER PUBLICATIONS

Yun Ding et al., Undetectable On-line Password Guessing Attacks, Oct. 1995, ACM, pp. 77-86. (Year: 1995).*

(Continued)

*Primary Examiner* — Luu T Pham
*Assistant Examiner* — Fahimeh Mohammadi
(74) *Attorney, Agent, or Firm* — Sterne, Kessler, Goldstein & Fox P L.L.C.

(57) ABSTRACT

A method for disabling a device associated with a virtual identity may include receiving, from the device, a request to use the virtual identity, where the request that may include a passcode guess and a device identifier. The method may also include determining that the passcode guess does not authorize use of the virtual identity and incrementing a number of incorrect passcode guesses received within a time interval. The method may additionally include determining that the number of incorrect passcode guesses received within the time interval is greater than or equal to a threshold. The method may further include storing an indication that subsequent requests associated with the device identifier should not authorize use of the virtual identity.

20 Claims, 19 Drawing Sheets

Related U.S. Application Data continuation of application No. 13/745,354, filed on Jan. 18, 2013, now Pat. No. 9,344,413.

(60) Provisional application No. 61/609,515, filed on Mar. 12, 2012, provisional application No. 61/609,854, filed on Mar. 12, 2012, provisional application No. 61/609,848, filed on Mar. 12, 2012, provisional application No. 61/588,084, filed on Jan. 18, 2012.

(51) Int. Cl.
*H04L 29/06* (2006.01)
*H04L 9/30* (2006.01)
*H04L 9/14* (2006.01)
*G06F 21/31* (2013.01)
*G06F 21/33* (2013.01)

(52) U.S. Cl.
CPC .............. *H04L 9/30* (2013.01); *H04L 9/3263* (2013.01); *H04L 63/06* (2013.01); *H04L 63/08* (2013.01); *H04L 63/0823* (2013.01); *H04L 63/0869* (2013.01); *H04L 63/12* (2013.01); *G06F 2221/2103* (2013.01); *H04L 63/083* (2013.01)

(58) Field of Classification Search
CPC ......... H04L 9/30; H04L 9/3263; H04L 63/06; H04L 63/0823; H04L 63/12; G06F 21/31; G06F 21/335
See application file for complete search history.

(56) References Cited

U.S. PATENT DOCUMENTS

| | | | |
|---|---|---|---|
| 5,559,505 A * | 9/1996 | McNair | H04M 3/382 340/5.28 |
| 5,715,314 A | 2/1998 | Payne et al. | |
| 6,209,091 B1 | 3/2001 | Sudia et al. | |
| 6,263,446 B1 | 7/2001 | Kausik et al. | |
| 6,289,323 B1 * | 9/2001 | Gordon | G06Q 20/04 705/40 |
| 6,381,331 B1 | 4/2002 | Kato | |
| 6,826,690 B1 | 11/2004 | Hind et al. | |
| 6,850,951 B1 | 2/2005 | Davison | |
| 7,266,695 B2 | 9/2007 | Nakayama | |
| 7,320,073 B2 | 1/2008 | Zissimopoulos et al. | |
| 7,428,750 B1 | 9/2008 | Dunn et al. | |
| 7,522,723 B1 | 4/2009 | Shaik | |
| 8,023,647 B2 | 9/2011 | Shaik | |
| 8,302,187 B1 * | 10/2012 | Gupta | H04L 65/1079 713/182 |
| 8,769,304 B2 | 7/2014 | Kirsch | |
| 9,177,005 B2 | 11/2015 | Mehta et al. | |
| 9,197,673 B1 | 11/2015 | Gaddy et al. | |
| 9,203,819 B2 | 12/2015 | Fenton et al. | |
| 9,215,223 B2 | 12/2015 | Kirsch | |
| 9,344,413 B2 | 5/2016 | Kirsch | |
| 2001/0024502 A1 | 9/2001 | Ohkuma et al. | |
| 2002/0076055 A1 | 6/2002 | Filipi-Martin et al. | |
| 2002/0108046 A1 * | 8/2002 | Armingaud | G06F 21/31 713/183 |
| 2002/0194163 A1 | 12/2002 | Hopeman et al. | |
| 2003/0057272 A1 * | 3/2003 | Bidan | G06Q 20/341 235/380 |
| 2003/0147534 A1 | 8/2003 | Ablay et al. | |
| 2003/0177400 A1 | 9/2003 | Raley et al. | |
| 2003/0204511 A1 | 10/2003 | Brundage et al. | |
| 2004/0062400 A1 | 4/2004 | Sovio et al. | |
| 2004/0088587 A1 | 5/2004 | Ramaswamy et al. | |
| 2004/0205342 A1 | 10/2004 | Roegner | |
| 2005/0010447 A1 | 1/2005 | Miyasaka et al. | |
| 2005/0044402 A1 | 2/2005 | Libin et al. | |
| 2005/0097320 A1 | 5/2005 | Golan et al. | |
| 2005/0220080 A1 | 10/2005 | Ronkainen et al. | |
| 2006/0080534 A1 | 4/2006 | Yeap et al. | |
| 2006/0083187 A1 | 4/2006 | Dekel | |
| 2006/0129817 A1 | 6/2006 | Borneman et al. | |
| 2006/0206709 A1 | 6/2006 | Kim | |
| 2006/0224508 A1 | 10/2006 | Fietz et al. | |
| 2006/0236095 A1 | 10/2006 | Smith et al. | |
| 2007/0061263 A1 | 3/2007 | Carter et al. | |
| 2007/0228148 A1 | 10/2007 | Rable | |
| 2007/0250920 A1 * | 10/2007 | Lindsay | G07F 7/1025 726/7 |
| 2008/0016232 A1 | 1/2008 | Yared et al. | |
| 2008/0028453 A1 | 1/2008 | Nguyen et al. | |
| 2008/0046987 A1 | 2/2008 | Spector | |
| 2008/0089520 A1 | 4/2008 | Kessler | |
| 2008/0141313 A1 | 6/2008 | Kato et al. | |
| 2008/0189778 A1 | 8/2008 | Rowley | |
| 2008/0222711 A1 | 9/2008 | Michaelis | |
| 2008/0250248 A1 | 10/2008 | Lieber | |
| 2008/0282091 A1 * | 11/2008 | Ashok | G06F 21/31 713/183 |
| 2009/0031406 A1 * | 1/2009 | Hirose | H04L 63/1441 726/7 |
| 2009/0037994 A1 | 2/2009 | Buss | |
| 2009/0077645 A1 * | 3/2009 | Kottahachchi | G06F 21/33 726/9 |
| 2009/0080408 A1 | 3/2009 | Natoli et al. | |
| 2009/0089625 A1 | 4/2009 | Kannappan et al. | |
| 2009/0157799 A1 | 6/2009 | Sukumaran et al. | |
| 2009/0159692 A1 * | 6/2009 | Chew | G06Q 20/341 235/492 |
| 2009/0249014 A1 * | 10/2009 | Obereiner | G06F 12/1441 711/164 |
| 2009/0249497 A1 | 10/2009 | Fitzgerald et al. | |
| 2009/0260064 A1 * | 10/2009 | McDowell | G06F 21/10 726/4 |
| 2009/0300364 A1 * | 12/2009 | Schneider | H04L 9/3271 713/178 |
| 2010/0077457 A1 | 3/2010 | Xu et al. | |
| 2010/0100945 A1 | 4/2010 | Ozzie et al. | |
| 2010/0100950 A1 | 4/2010 | Roberts | |
| 2010/0161969 A1 | 6/2010 | Grebovich et al. | |
| 2010/0174439 A1 | 7/2010 | Petricoin, Jr. et al. | |
| 2010/0182283 A1 | 7/2010 | Sip | |
| 2010/0210240 A1 | 8/2010 | Mahaffey et al. | |
| 2010/0275009 A1 | 10/2010 | Canrad et al. | |
| 2010/0306107 A1 | 12/2010 | Nahari | |
| 2010/0316217 A1 | 12/2010 | Gammel et al. | |
| 2011/0067095 A1 | 3/2011 | Leicher et al. | |
| 2011/0078439 A1 | 3/2011 | Mao et al. | |
| 2011/0179475 A1 | 7/2011 | Foell et al. | |
| 2011/0225090 A1 * | 9/2011 | Hammad | G06Q 20/401 705/44 |
| 2011/0246765 A1 | 10/2011 | Schibuk | |
| 2012/0050455 A1 | 3/2012 | Santamaria et al. | |
| 2012/0124379 A1 | 5/2012 | Teranishi | |
| 2012/0155637 A1 * | 6/2012 | Lambert | H04L 9/0869 380/44 |
| 2012/0158725 A1 | 6/2012 | Molloy et al. | |
| 2012/0233685 A1 | 9/2012 | Palanigounder et al. | |
| 2012/0265631 A1 | 10/2012 | Cronic et al. | |
| 2012/0323686 A1 * | 12/2012 | Burger | G06Q 50/01 705/14.55 |
| 2012/0324076 A1 * | 12/2012 | Zerr | H04W 4/21 709/223 |
| 2012/0324242 A1 | 12/2012 | Kirsch | |
| 2012/0331296 A1 | 12/2012 | Levin et al. | |
| 2013/0198078 A1 | 8/2013 | Kirsch | |
| 2013/0198516 A1 | 8/2013 | Fenton et al. | |
| 2013/0198598 A1 | 8/2013 | Kirsch | |
| 2013/0198834 A1 | 8/2013 | Kirsch | |
| 2013/0205136 A1 | 8/2013 | Kirsch | |
| 2013/0246272 A1 | 9/2013 | Kirsch | |
| 2013/0246280 A1 | 9/2013 | Kirsch | |
| 2014/0214902 A1 | 7/2014 | Mehta et al. | |
| 2014/0344904 A1 | 11/2014 | Venkataramani et al. | |
| 2014/0351596 A1 | 11/2014 | Chan | |
| 2015/0088754 A1 | 3/2015 | Kirsch | |

(56) References Cited

U.S. PATENT DOCUMENTS

| | | |
|---|---|---|
| 2016/0241509 A1 | 8/2016 | Akcin |
| 2016/0261413 A1 | 9/2016 | Kirsch |
| 2017/0324564 A1 | 11/2017 | Knopf |
| 2018/0013569 A1 | 1/2018 | Knopf |
| 2018/0013570 A1 | 1/2018 | Knopf |
| 2018/0013786 A1 | 1/2018 | Knopf |
| 2018/0013824 A1 | 1/2018 | Knopf |

OTHER PUBLICATIONS

Marc Barisch, Modelling the Impact of Virtual Identities on Communication Infrastructures, Nov. 2009, ACM, pp. 45-52. (Year: 2009).*

Mansour Alsaleh et al., Revisiting Defenses against Large-Scale Online Password Guessing Attacks, May 12, 2011, IEEE, vol. 9, Issue: 1, pp. 128-141. (Year: 2011).*

Vipul Goyal et al., CompChall: Addressing Password Guessing Attacks, May 16, 2005, IEEE, pp. 1-6. (Year: 2005).*

Abe, T. et al. "Implementing Identity Provider on Mobile Phone" 2007, ACM, pp. 46-52.

Balasubramaniam, S. et al. "Identiy Management and its Impact on Federation in a System-of-Systems Context" Mar. 23-26, 2009, IEEE, pp. 179-182.

Beasley, J. et al. "Virtual Bluetooth Devices as a Means of Extending Pairing and Bonding in a Bluetooth Network" 2002, IEEE, vol. 4, pp. 2087-2089.

Chakchai So-In et al., "Virtual ID: A Technique for Mobility, MultiHoming, and Location Privacy in Next Generation Wireless Networks," Jan. 9-12, 2010, IEEE, pp. 1-5.

Chen, Liqun et al., "Multiple Trusted Authorities in Identifier Based Cryptography from Pairings on Elliptic Curves," Mar. 19, 2003, HP, pp. 1-26.

Jansen, Wayne et al., "Guidelines on Cell Phone and PDA Security," Oct. 2008, NIST, pp. 1-52.

Kholmatov, A. et al. "Identify authentication using improved online signature verification method," ScienceDirect, Nov. 2005, vol. 26, Issue 15, pp. 2400-2408.

Masmoudi, K. et al. "Building identity-based security associations for provider-provisioned virtual private networks," Dec. 2008, Springer, vol. 39, Issue 3, pp. 215-222.

Mayrhofer, Rene et al., "Shake Well Before Use: Intuitive and Secure Pairing of Mobile Devices," Feb. 27, 2009, IEEE, vol. 8, Issue 6, pp. 792-806.

Nguyen, Lang et al., "Secure Authorization, Access Control and Data Integrity in Bluetooth," 2002, IEEE, pp. 428-433.

Novotny, J. et al. "An Online Credential Repository for the Grid: MyProxy," IEEE, 2001, pp. 104-111.

Squicciarini, A. et al. "Access Control Strategies for Virtualized Environments in Grid Computing Systems," Mar. 21-23, 2007, IEEE, pp. 48-54.

International Search Report and Written Opinion dated Sep. 18, 2012 for International Patent Application No. PCT/US2012/042743, 19 pages.

International Search Report and Written Opinion dated Mar. 29, 2013 for International Patent Application No. PCT/US2013/022207, 13 pages.

International Search Report and Written Opinion dated Jul. 25, 2017 from the U.S. International Search Authority for PCT/US17/31438, 8 pages.

International Search Report and Written Opinion dated May 30, 2018 from the U.S. International Search Authority for PCT/US18/21877, 8 pages.

* cited by examiner

METHODS AND SYSTEMS FOR DEVICE AUTHENTICATION

CROSS-REFERENCES TO RELATED APPLICATIONS

This application is a continuation of U.S. patent application Ser. No. 13/745,354, filed Jan. 18, 2013, which is incorporated herein by reference. U.S. patent application Ser. No. 13/745,354 claims the benefit of the following four U.S. Provisional Patent Applications, each of which are incorporated by reference into this application for all purposes:
- U.S. Provisional Patent Application No. 61/609,848, filed Mar. 12, 2012 entitled "Methods and Systems for Secure Identity Management";
- U.S. Provisional Patent Application No. 61/609,515, filed Mar. 12, 2012 entitled "Method and System for Pairing of Mobile Devices";
- U.S. Provisional Patent Application No. 61/609,854, filed Mar. 12, 2012, entitled "Methods and Systems for Device Disablement"; and
- U.S. Provisional Patent Application No. 61/588,084, filed Jan. 18, 2012, entitled "Single Identification for Transactions".

The following four regular U.S. patent applications are incorporated by reference into this application for all purposes.
- U.S. patent application Ser. No. 13/745,332, filed Jan. 18, 2013, entitled "Methods and Systems for Secure Identity Management";
- U.S. patent application Ser. No. 13/745,341, filed Jan. 18, 2013, entitled "Methods and Systems for Pairing Devices";
- U.S. patent application Ser. No. 13/745,318, filed Jan. 18, 2013, entitled "Secure Population of Form Data"; and
- U.S. patent application Ser. No. 31/745,304, filed Jan. 18, 2013, entitled "Secure Graphical Code Transactions".

BACKGROUND OF THE INVENTION

As many everyday transactions move to an online environment, a large amount of personal information must be sent over the Internet. Many experts consider the insecurity of online identities to be the most important problem to be solved on the Internet today. Users of social networks, online banking, and email are in constant danger of phishing, malware, and key logging attacks, as well as massive centralized data breaches that expose users' passwords and financial account information.

Despite the widespread use of personal information over the Internet, there is a need in the art for improved methods and systems for account verification.

SUMMARY OF THE INVENTION

The present invention relates generally to online, or virtual identities. More specifically, the present invention relates to methods and systems for disabling devices after a number of incorrect passcode guesses. Merely by way of example, the invention has been applied to a method of disabling a device attempting to use or authorize a virtual identity. Furthermore, the invention has been applied to a method of disabling a device used in a pairing operation. The methods and techniques can be applied to a variety of transactions, interactions, and identity management systems.

In one embodiment, a method for disabling a device associated with a virtual identity may include receiving, from the device, a request to use the virtual identity, where the request that may include a passcode guess and a device identifier. The method may also include determining that the passcode guess does not authorize use of the virtual identity and incrementing a number of incorrect passcode guesses received within a time interval. The method may additionally include determining that the number of incorrect passcode guesses received within the time interval is greater than or equal to a threshold. The method may further include storing an indication that subsequent requests associated with the device identifier should not authorize use of the virtual identity.

In some embodiments, the method may also include sending, to one or more user devices associated with the virtual identity, an indication that the device cannot authorize the use of the virtual identity. The method may additionally include receiving, from an authorized user device: a second passcode guess and an indication that the device should be reauthorized, determining that the second passcode guess authorizes the use of the virtual identity, and determining that the subsequent requests associated with the device identifier can authorize the use of the virtual identity.

In some embodiments one or more user devices associated with the virtual identity may be allowed to provide correct passcode guesses and authorize use of the virtual identity. The passcode guess may be based on a PIN. The passcode guess may comprise a hash of a salted password. The indication that the device cannot authorize the use of the virtual identity may comprise a push notification to a smart phone. The number of incorrect passcode guesses may be reset when a valid passcode guess is received.

In another embodiment, a method for disabling a device associated with a virtual identity may include receiving, from the device, a request to register an unregistered device. The request may include a passcode guess and a device identifier. The method may also include determining that the passcode guess does not authorize registration of the unregistered device and incrementing a number of incorrect passcode guesses received within a time interval. The method may additionally include determining that the number of incorrect passcode guesses received within the time interval is greater than or equal to a threshold. The method may further include storing an indication that subsequent requests associated with the device identifier should not register unregistered devices.

In some embodiments, the method may also include sending the indication that subsequent requests associated with the device identifier should not register unregistered devices to a pairing repository. The method may additionally include receiving a request to register a second unregistered device, where the request may include a second passcode guess and the device identifier. The method may further include denying the request to register the second unregistered device based on the stored indication.

In some embodiments the passcode guess may comprise a digital signature derived from a user-provided passcode. The unregistered device may comprise a smart phone. The request to register the unregistered device may further comprise an encrypted salt value. The request to register the unregistered device may further comprise a pairing code.

In yet another embodiment, an identity repository may include one or more interfaces that receive requests from user devices, one or more processors, and one or more memories communicatively coupled to the one or more processors, having instructions stored thereon, which, when executed by the one or more processors, cause the one or more processors to receive a request from the device through the one or more interfaces, the request comprising a passcode guess and a device identifier. The instructions may further cause the processor(s) to determine that the passcode guess is incorrect, increment a number of incorrect passcode guesses received within a time interval, determine that the number of incorrect passcode guesses received within the time interval is greater than or equal to a threshold, and generate an indication in the one or more memories that subsequent requests associated with the device identifier should not be granted.

In some embodiments, the instructions may also cause the processor(s) to send the indication to a pairing repository that is physically separate from the identity repository. The one or more memories may further store encrypted personal information associated with a virtual identity, where the device identifier may be associated with the virtual identity. The request from the device may include a request to use a virtual identity. The request from the device may include a request to pair an unregistered device with a virtual identity.

Numerous benefits can be achieved byway of the present invention over conventional techniques. For example, embodiments of the present invention eliminate the risk posed by a single compromised device without disabling other devices or the virtual identity itself. Additionally, embodiments of the present invention may be used with an identity repository and/or a pairing repository. Preferences may offer fully customizable security settings, thresholds, time intervals, and/or corrective actions. These and other embodiments along with many of its advantages and features are described in more detail in conjunction with the text below and attached figures.

DETAILED DESCRIPTION OF THE INVENTION

Figure 1:
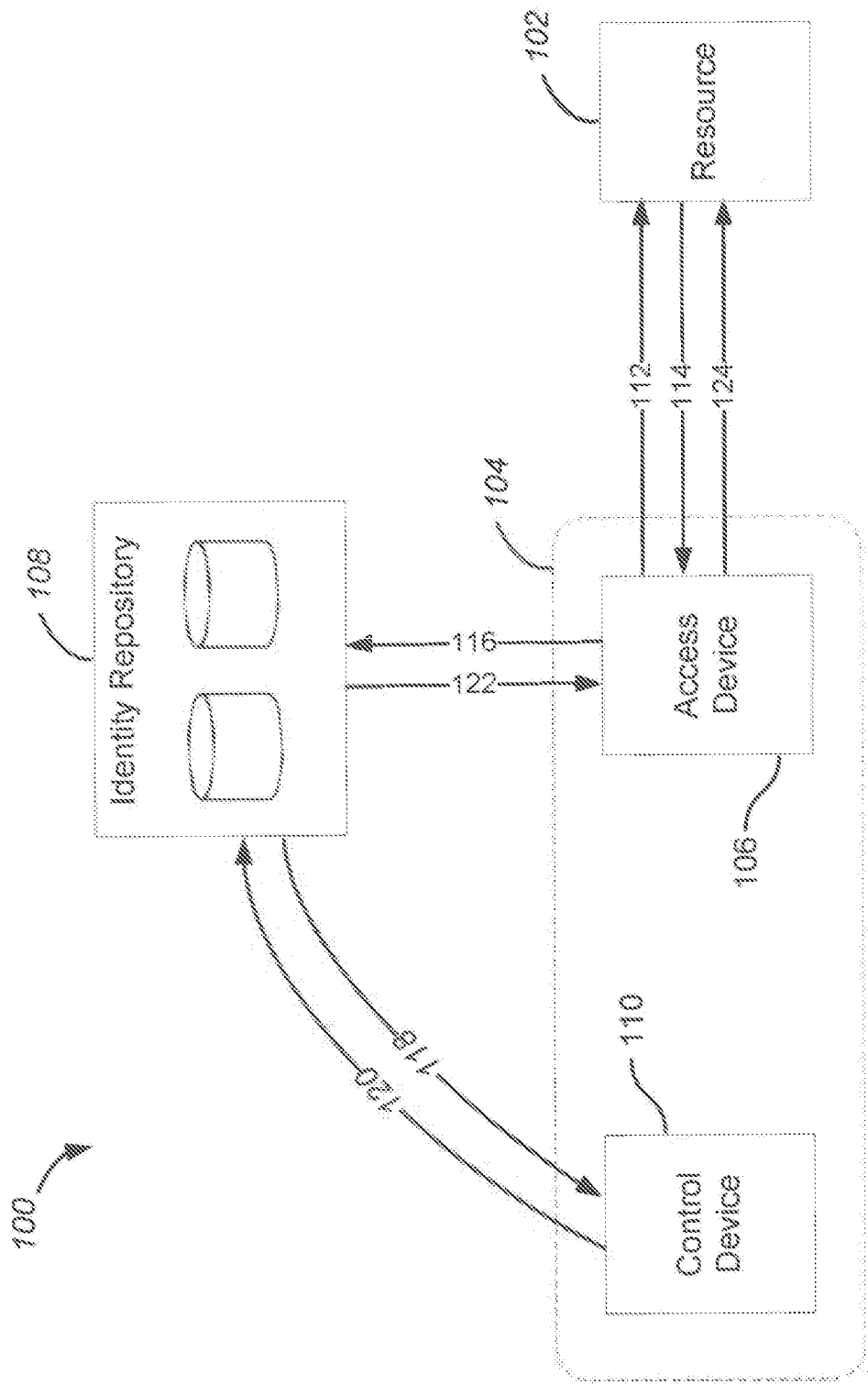
FIG. 1 illustrates a simplified block diagram of a system for online identity management, according to an embodiment of the present invention.

Embodiments of the present invention relate to technologies that provide for an identity management system and method that eliminate the need for centralized storage of secrets. Additionally, technologies related to embodiments of the present invention provide for an identity management system and method that eliminate the need to use shared secrets between two parties.

Genera Overview

Virtual identities are currently in widespread use in myriad, such as the Internet. However, existing solutions are unable to provide consumers with a way to authenticate transactions and identities that is both convenient for the user as well as secure against modern-day threats. Most systems still use a username and password, a method that was invented over 50 years ago Thus, managing digital identities remains inconvenient, insecure, and hard to use. More importantly, phishing, malware, and key logging attacks, as well as massive centralized data breaches exposing users' passwords and credit card information are becoming more frequent.

There are two fundamental reasons that existing solutions lack adequate security. First, these solutions rely on the use of shared secrets, such as passwords, credit card numbers, and authorization tokens Second, these solutions rely on the centralized storage of these secrets. Currently, every consumer website requires using a shared secret to login.

In contrast, the methods and systems described herein solve this problem by introducing a new paradigm for identity management that is based on public-key cryptography that is immune to a single point of compromise as well as human engineering (i.e., phishing). Additionally, these methods and systems give control of the users identity to the user. These methods are also fully compatible with the National Strategy for Trusted Identities in Cyberspace (NSTIC) standards set by the U.S. Government for digital identity. These methods and systems eliminate the need for users to memorize or keep track of hundreds of usernames and passwords.

Broadly speaking, with respect to a particular embodiment, users may first provide proof to their device that they are present, for example, using a password. Then, the user's device authenticates their identity using public-key cryptography to websites, desktop applications, mobile applications, and/or enterprise applications Using this disclosure, one having skill in the art can modify any existing website to accept an authentication using this form of public key cryptography. Each individual device can be preauthorized for use by a particular user. This may be done with a one-time process using a pairing code and password. After each device has been authorized for use by the user, the user can log into that device simply by selecting their name from a list of user names authorized on that device. A password may also be required if specified by the user.

Consequently, in this embodiment, password phishing, key logging, and guessing attacks are much harder to accomplish since the password can only be entered on pre-authorized devices and because high value transactions can require out-of-band (OOB) approval using a different device and a different code. Generally, a virtual identity may be authenticated between an access device and a resource. As used herein, an "OOB authorization" refers to an authorization that requires input from either a third device, referred to as a control device, or from a second software process operating on the access device. Once a device is logged in under a user, individual resources can then be accessed by pressing a "sign in" button on an enabled website.

In some embodiments, users may optionally secure their account on any device from unauthorized use using a user-defined password of any length or with an OOB authorization. In one embodiment, an alert can pop up in an app on the user's mobile phone that asks for a PIN from the user. In another embodiment, a user could require a password be entered every 22 hours (and every time the user identity is changed to the particular user on that device), while a second user might not care and could allow anyone to switch to his/her identity on the same device without ever entering a password. The level of security can be left up to the user.

In one embodiment, if the user is using a public terminal, lie/she can require that every use of his/her identity be approved by an OOB authorization on a second device using a PIN code entered at least every "X" hours. This may prevent an active session from being compromised. It is unlikely that an attacker will be able to sneak into a without a user's knowledge because OOB transactions can require the approval by the second device.

One embodiment may also be used for information sharing. Users can store any self-asserted attribute in their identity repository, such as their name, shipping address(es), credit card information, and/or the like. Embodiments can then securely provide relying websites with this user information, without requiring manual entry of this information each time.

Some embodiments combine new elliptic curve cryptographic techniques (compliant with National Security Agency (NSA) Suite B standards) to provide high security authentication without sacrificing usability. In one embodiment, an innovative key-value data repository can be totally encrypted (both the keys and values can be encrypted). Therefore, users can always have express control of the use of their identity and attributes since it is impossible for the central repository to assert a user identity without cooperation of the user's endpoint device(s).

In one embodiment, the systems described herein can work with an open identity federation where the members of the federation support an API. Users can choose their repository operator and transfer their credentials between repositories securely. For example, a user working for a private company may choose to have the private company store his/her identity. If the user later gets a job with the U.S. Government, he/she can easily move his/her identity without modification to a repository hosted by the U.S. Government. This is similar to the way a user can get a credit card from one bank, change banks, and then get a new credit card that will work with the same set of merchants as the old card.

At the most basic level, the embodiments described herein can be used to assist in authenticating, or logging in, to websites and other services on the Internet. Desktop, enterprise, and/or mobile apps can similarly be enabled so that users are not required to type anything to log in. These embodiments can also be used for authentication, filling out forms, secure credit card transactions, authorizations, and/or information sharing. In one embodiment, the system can be used to prove digital claims. For example, a user could prove claims such as their age, student status, current employment, veteran status, right to use digital content like music and software, proof of citizenship, and/or the like. In another embodiment, the system can be used as a repository for digital proofs, such as software music licenses, receipts for physical goods, proofs of purchase, and/or the like. These digital proofs can be accessed at any time, because the system works on-line, off-line, and/or over the phone. Additionally, embodiments described herein can be used to log into enterprise applications using a VPN or SSO portal. Identity proofs can be used to acquire a boarding pass or to gain physical access to a building. An identity can be securely proved over a phone by entering four digits that are communicated to the receiving party. Documents can be securely signed, and micro-payments can be secured. Finally, the system can facilitate "on paper" transactions, such as filling out a form at a doctor's office, by providing a pairing code and an identifier. As used herein, the term "transaction" may broadly include any of the transactions listed above, along with other similar transactions that would be understood by one having skill in the art.

The embodiments described herein offer numerous advantages over existing solutions. Depending on the particular embodiment, one or more of these advantages may be realized. For example, a user's identity and information, such as credit cards, may not be used without express approval. Forms can be automatically filled out Almost every existing web browser can be used with minor alterations to login webpages. Identities can be portable, moving between different identity repository providers. Micro-payments between users and vendors can be securely transacted. Digital proofs of information can be provided such as age, status, or employment. Typing can be minimized by the user. Significantly, a user can be put in complete control of his identity and how it is used. This allows the user to control the trade-off between security and convenience. Users can engage in high-value transactions and other high-risk uses, while maintaining the convenience often desired for trivial uses. Resources, or "relying parties," can deal directly with the user's access device, rather than a third-party provider.

In addition to these advantages in convenience for users, one or more of the following security advantages may also be realized. Website visits need not be tracked. Credit card transactions can be tokenized. NSA suite B secure cryptography can be used. Secrets need not be shared but can rather be decrypted at the endpoints. Endpoint devices can securely transfer endpoint secrets to new devices securely. PINs and passwords can be protected against brute force attacks. Fishing, key logging, and password guessing can be prevented because knowledge-based authentications, such as PINs and passwords, can be used on preauthorized devices. Credit card transactions can use end-two-end security that is digitally signed by the cardholder and verified by the acquirer and the issuer. Payment Card Industry (PCI) liability can be reduced because service providers may choose to never see credit card numbers that are tokenized. Finally, the system can be designed such that there is no single point of compromise that can lead to a mass security compromise Security levels can be set for each resource, such that banks can enforce a higher level of security than an e-mail account. Security levels can include a login timeout for each user device, such that less secure devices can be timed out faster Amount thresholds can be set for transactions as well as cumulative amounts over a time period, thus users can limit their exposure if a device is compromised. Additionally, each attribute stored by a user, such as a shipping address or a credit card number, can have its own security level. Compromised devices can be disabled after a certain number of incorrect guesses for a password or PIN. Users can also log into the identity repository to view every transaction using their identity. Security settings and permissions can require OOB approval with a PIN. In order to authorize a new user device, an identity repository may require possession of an existing authorized device and knowledge of a PIN and/or a password.

In one embodiment, the identity repository is designed for a user to pair his/her identity to a device owned by the system administrator. The user device can be an access device, a control device, or both. The system administrator can then switch to the user using customary "switch user" mechanisms. The user can choose the permission levels that a system administrator would need in order to do this. For example, the user could require approval by the user's control device. The user can also disable the system administrator's access to the user's identity at any time from any of the user's devices. In essence, the system administrator's device can be treated exactly as if it is yet another device owned by the user, so a user can delegate as much or as little authority as he/she wants to the system administrator.

In one embodiment, users can select between various options for authenticating to each of their devices. These options may include leaving the user permanently logged in and requiring a manual log out. Users could also select their name from a user list and type in their password. Alternatively, users could select their name and confirm their identity using a control device and a pin. An auto-logout timeout can be independently set for each user device.

Because the system does not require shared secrets, a virtual identity can be difficult for a user to lose. So long as the user has a recovery code or a user device that is registered with the identity repository, the user can recover their identity.

Secure Identity Management

FIG. 1 illustrates a simplified block diagram 100 of a system for online identity management, according to an embodiment of the present invention. The system may be configured to use one or two user devices. At its most basic level, the system can use an access device 106. The access device 106 will typically be the device the user is using for an interaction. Second, an optional control device 110 may be used. The control device 110 may comprise a personal device, such as a smart phone, tablet computer, personal computer, and/or personal digital assistant (PDA) that is controlled by the user. Additionally, a remotely located identity repository 108 can be used in the interaction. The access device 106 can engage in the interaction with a resource 102. The resource can include a website, a database, a web service, and/or the like. Man-in-the-middle attacks can be reduced because cryptographic secrets can be transferred from user controlled endpoint devices securely, even if the identity repository is compromised by an attacker.

In this embodiment, the access device 106 (AD) may comprise a user device that is being authenticated to perform a transaction using a virtual identity. The control device 110 (CD) may comprise a second user device in the user's control that is used to set access rights for the users access device 106 and to perform OB authentication/verification. The resource 102 (RP) may be defined as a party, typically a website, to which the user wishes the virtual identity to be authenticated and, optionally, with which to share attributes and perform additional transactions. The identity repository 108 (Repo) may be defined as an online database of encrypted credentials and attribute/value pairs. The identity repository 108 may be remotely located and may be operated by a third party that is not associated with either the user or the resource 102. Each access device 106 and control device 110 may have a unique identifier, referred to as a Device ID (DEVID). Additionally, each user may have a unique identifier, or Global User ID (GUID), that is stored on the access device 106 and on the control device 110 and can be used to index information stored on the identity repository 108. Finally, each user may have a second UID (UID) that comprises a site-specific identifier for the user for the resource 102. The UID can be derived at least in part from the fully-qualified domain name associated with the resource 102.

In one embodiment, the access device 106 and the identity repository 108 can be required in order to complete a transaction. The control device 110 can be a separate device from the access device 106, or the same physical device can be used as both the access device 106 and the control device 110. For example, a laptop can function as both the access device 106 and the control device 110. A mobile phone could also function as both devices. Participation by the control device 110 may optionally be required in a transaction to provide a higher level of assurance that the user has consented to the transaction. This process will be described further below. At any time, the user may choose to use a higher security mode comprising a higher level of assurance. The user can also choose to lock out any individual device or force the individual device into a higher security mode. These actions can be performed on any device registered by the user. Furthermore, some embodiments may employ a special "tripwire" feature so that, if a password or PIN is not entered when requested, a device will be prevented from supplying any subsequent digital signatures until the requested password or PIN is provided.

As used herein, transactions may use a varying "Level of Assurance" (LoA) mode. In one embodiment, four modes are supported: disabled, enabled with no security, password with a timeout, and OOB authorization required with an optional PIN and timeout. Users can control the LoA mode required by each type of transaction. To minimize risk in the case of a lost user device, devices can be immediately turned off from any remaining registered device that the user still controls. In one embodiment, the identity repository 108 can enforce the greater of two LoA modes: the level requested by the user and the level requested by the resource 102. This can ensure that organizations, such as financial institutions, can be compliant with regulations regardless of the security level requested by the user. For example, a bank could require that, for transaction to be approved, a PIN should be entered on the control device 110 within a time period, such as 5 minutes. For banks, two factor authentication may be required by FFIEC regulations.

According to one embodiment, the conditions in an LoA mode may be based on information related to the devices owned or operated on behalf of the user or devices authorized for the user with limits on how devices can be used in the transaction. For example, a desktop computer in a secure work area may have a higher transaction value limit than a mobile device. A mobile device with a password-to-unlock feature may have a higher transaction value limit than an unlocked mobile device One of ordinary skill in the art would recognize many variations, modifications, and alternatives.

The conditions in an LoA mode can include information related to preferences established by one of the parties, including transaction value limits, time periods during which transactions are initiated, geographic locations where the transaction is initiated, histories of returns or invalidated transactions, user reputations, number of transactions within a particular time period, or the like. The conditions in an LoA mode can also include cumulative data, including thresholds for the number of items in a single purchase, cumulative costs of items in a single transaction, cumulative amount spent in a particular time period, and/or the like Therefore, the conditions in an LoA mode can comprise a cost threshold for a single transaction, a cumulative cost threshold for transactions during a time period or a time limit since a password was provided to a user device. These conditions can be used to define almost every aspect of a transaction/interaction, such that a party can set specified authentication levels that add security to high-value transactions or transactions where the risk of fraud is high. It should be noted that if preferences received from a party contradict preferences already stored on the device executing this method, the more conservative or secure preferences can be used in the transaction.

According to one embodiment, the conditions in an LoA mode may also include conditions related to types of transactions. For example, purchasing certain types of goods, such as jewelry, cars, software, collectibles, or the like, that are more likely to be involved in theft and fraud can require higher levels of authentication. The conditions can also include conditions on payment options. For example, purchasing items with a credit card may require a first authorization level, while paying for items with a debit card may require a second authorization level. The preferences can also include conditions on methods of shipping or shipping locations. For example, shipping items to a PO Box or to an address different from the billing address may require a higher authorization level.

Each of the conditions of an LoA mode may be associated with one or more authentication levels. If the condition is met, then the specified authentication level (or a higher authentication level) should be used in the transaction/interaction. An authentication level can comprise requiring an indication that the transaction is approved to be received by a user module operating on a user device. For example, a user may be required to provide input indicating that they have reviewed the transaction and approve. An authentication level can also comprise notifying additional devices that are associated with the user. For example, a notification can be sent to a user's cell phone or tablet computer for a transaction that was initiated on the user's desktop computer. An authentication level can comprise requiring a PIN or password to be received by one or more of the additional devices associated with the user, such as a control device. An authentication level can comprise a waiting period between initiating the transaction and final approval. In one embodiment, an authentication level may require human contact by a representative of the relying party. In another embodiment, an authorization level can require a third-party to authenticate the transaction, such as the identity repository.

In one embodiment, an LoA mode can also specify a timeout period associated with each PIN and/or password. For example, one mode could specify that a password should be entered into the access device within the last three hours preceding the transaction/interaction. As another example, one mode could specify that a PIN should be entered into the control device within five minutes preceding the transaction interaction. The timeout period may be affected by other factors, such as the time of day of the transaction, a cost associated with the transaction, the security of the device used in the transaction, a cumulative cost of a set of transactions, and/or any other factors described above. For example, a timeout period may be longer on a secure device, whereas the timeout period may be shorter on an insecure device.

What follows is a brief description of one exemplary transaction. Each step in this exemplary transaction will be discussed in more detail later in this disclosure. Returning to block diagram 100 of FIG. 1, the access device 106 can access the resource 102 (112). In response, the resource 102 can return a random digital challenge and request that the access device 106 return the challenge signed by two or three signatures (114). Next, the access device 106 can generate one or more cloud repository keys. The access device 106 can pass the digital challenge and/or the one or more cloud repository keys to the identity repository 108 (116). If the access device 106 is password protected and a timeout period is exceeded, the user may supply digital proof that the user knows the password to the access device 106. The digital proof may comprise a guess of the password. In one embodiment, the digital proof is not transmitted off of the access device 106, not even in a hashed or encrypted form. Confirmation that the user knows the password is provided by signing a challenge from the identity repository 108.

The identity repository 108 can compare a first LoA mode specified by the access device 106 with a second LoA mode specified by the resource 102 to determine whether an OOB approval should also be required for the transaction. If an OOB approval is determined to be required by either the access device 106, the identity repository 108, or the resource 102, the identity repository 108 sends a challenge to the control device 110 (118). In one embodiment, certain details of the original transaction can be displayed to the user on the control device 110, thus eliminating the possibility of a man-in-the-browser attack or a man-in-the-middle attack. A PIN can also be requested by the control device 110. If a PIN has not been provided within a timeout period, the control device 110 may prompt the user to enter the PIN In one embodiment, any PIN guess entered by the user never leaves the control device 110. Instead, the control device 110 can rely on asymmetric cryptography and another challenge from the identity repository 108 to prove to the identity repository 108 that the user has supplied the correct PIN. This process will be described further later in this disclosure.

Approval for the transaction, along with any signed challenges, can be sent back to the identity repository 108 (120). In one embodiment, the control device 110 signs the challenge from the resource 102 using a private key stored on the control device 110.

The identity repository 108 can enforce the LoA mode on the transaction. Therefore, the identity repository 108 can withhold its signature on the challenge unless all of the requirements of the LoA mode have been met. If the identity repository 108 determines that all of these requirements have been met, the identity repository 108 can sign the challenge using its private key. The identity repository 108 can then send the signature of the control device 110 and the signature of the identity repository 108 to the access device 106 (122). At this point, the access device 106 can sign the challenge and return all two/three signatures to the resource 102 (124). Additionally, the access device 106 can send a user ID (the site-specific user ID). The resource 102 can look up a set of public keys that are associated with the UID to verify that all three signatures correspond to the public keys and grant access to the user. In one embodiment, the public keys can be unique to the resource 102. In other words, each website will be associated with its own set of public and private key pairs. This can assure a user's privacy and prevent website tracking. Because the resource 102 interacts with the access device 106, the identity repository 108 can be prevented from determining which resources the user has visited. The identity repository 108 simply holds an encrypted block of data and receives commands to read and write encrypted keys and values.

The identity management system can use a number of different cryptographic keys that are stored on various devices throughout the system. Table 1 includes a list of specific encryption keys that may be stored according to one embodiment. It will be understood that this is but one embodiment and that either more or fewer keys may be used in other embodiments.

tion. The embodiment of FIG. 2 uses a subset of the keys listed in Table 1. Note that the remaining keys in Table 1 may be operative in the background of the system illustrated by FIG. 2. Additionally, the keys in FIG. 2 may be derived from one or more of the keys listed in Table 1. As described earlier, an access device 210 may engage in a transaction with a number of resources 202. Each of the resources 202 may have a set of public keys associated with a UID of a user of the access device 210. For example, resource 202-1 stores two to three public keys for the UID 210, namely an AD public key 204-1 that is associated with the access device 210, an IR public key 206-1 that is associated with an identity repository 218, and, optionally, a CD public key 208-1 that is associated with a control device 224.

When the access device 210 first attempts a transaction with one of the resources 202, the access device 210 can provide the public keys 204, 206, 208 to the resources 202. Each of the resources 202 may have a unique set of public keys. In providing the public keys 204, 206, 200, the access device 210 may create the AD public keys 204, and the IR public keys 206 and the CD public keys 208 can be obtained from the identity repository 218 and the control device 224, respectively.

When initiating a transaction, the resources 202 can send a digital challenge to the access device 210 to authenticate a virtual identity. When the LoA mode requirements of each device of been met, each device may sign the digital challenge using the private keys that correspond to the public key of the particular resource. For example, a digital challenge sent from resource 202-1 could be signed by the access device 210 using AD private key 212 and the identity repository 218 using the IR private key 220. Optionally, the digital challenge could also be signed by the control device 224 using the CD private key 226. Each of these devices may enforce one or more requirements of the LoA mode before signing. For example, the control device 224 may require a pin from the user, and the identity repository 218

TABLE 1

| Key name | Type | Shared by | Created by | Plurality |
|---|---|---|---|---|
| Access Master Key (AMK) | Symmetric, 128 bits | All ADs and Repo | First AD | Per user |
| Access Device Key (ADK) | Symmetric, 128 bits | All ADs | Derived from AMK | Per user |
| Control Master Key (CMK) | Symmetric, 128 bits | All CDs and Repo | First CD | Per user |
| Shared Device Key (SDK) | Symmetric, 128 bits | All ADs and CDs | Derived from AMK | Per user |
| Access Device Signature keypair (ADS) | Asymmetric ECDSA, 256 bits | All ADs | Derived from AMK | Per user |
| Control Device Signature keypair (CDS) | Asymmetric ECDSA 256 bits | All CDs | Derived from CMK | Per user |
| Access Identity Signature keypair (AIS) | Asymmetric ECDSA, 256 bits | ADs | Derived from AMK, RP name | Per user per RP |
| Control Identity Signature keypair (CIS) | Asymmetric ECDSA, 256 bits | CDs | Derived from CMK, RP name | Per user per RP |
| Repo User Key (RUK) | Symmetric, 128 bits | Repo | Repo | Per user |
| Repo Identity Signature keypair (RIS) | Asymmetric ECDSA, 256 bits | Repo | Derived from RUK, RP name | Per user per RP |

Figure 2:
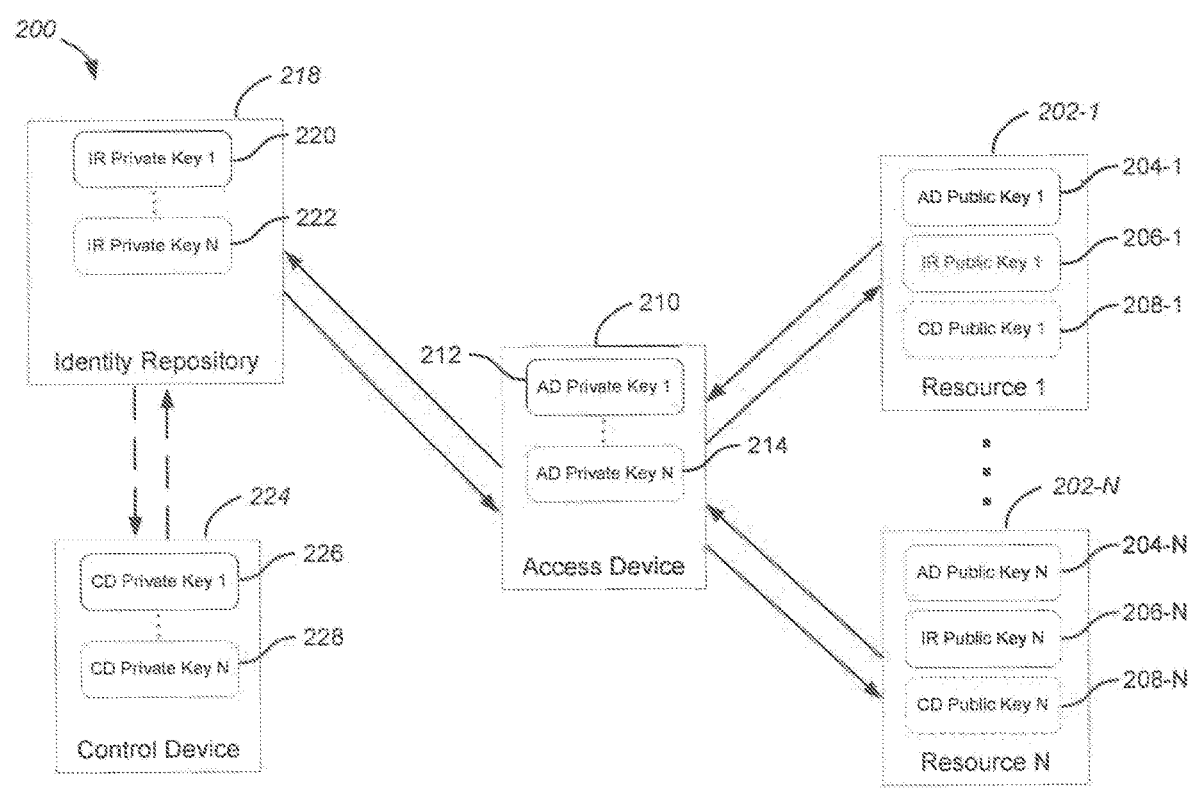
FIG. 2 illustrates a simplified block diagram of a system for online identity management with distributed secrets, according to one embodiment.

FIG. 2 illustrates a simplified block diagram 200 of a system for online identity management with distributed secrets, according to an embodiment of the present invention. may require an OOB authorization from the control device 224. The access device 210 may require a signature from the identity repository 218 as well as a signature from the control device 224 before signing the digital challenge. Other embodiments may enforce different requirements as described elsewhere herein.

In one embodiment, each of these keys are actually stored on their respective devices. In another embodiment, a master key is stored and each device from which the keys in FIG. 2 are deterministically derived when they are needed. For example, the AD private key 212 may be derived from the Access Device Key (ADK) for the access device 210 listed in Table 1.

Figure 3:
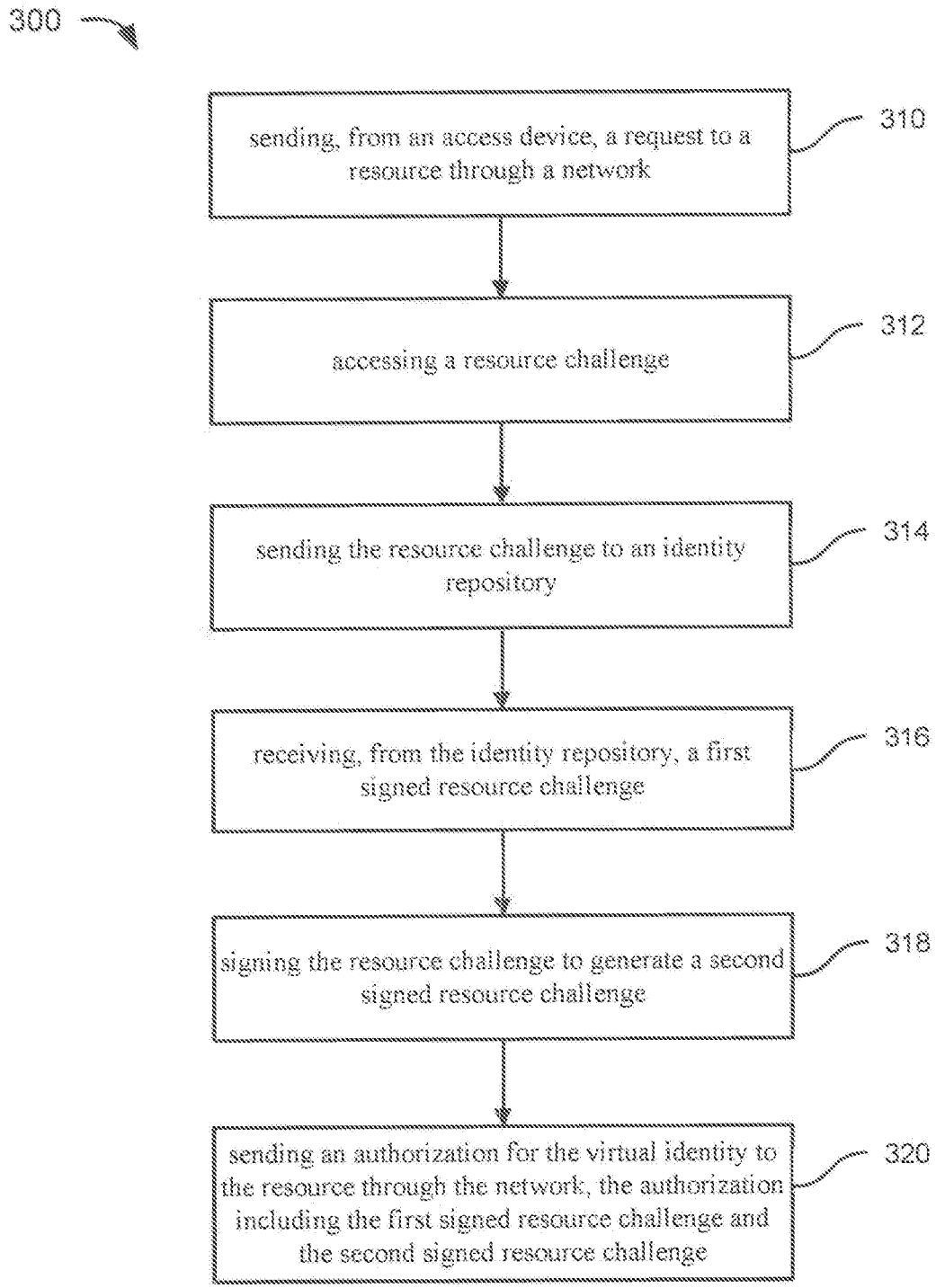
FIG. 3 illustrates a simplified flowchart illustrating a method for authorizing a virtual identity using an access device for an interaction with a resource over a network, according to one embodiment.

Described next are specific methods according to particular embodiments for authorizing a transaction between an access device and a resource. Each of these methods will describe the transaction from the perspective of one of the least for devices involved, namely the resource, the access device, the identity repository, or the control device. FIG. 3 illustrates a simplified flowchart 300 illustrating a method for authorizing a virtual identity using an access device for an interaction with a resource over a network, according to one embodiment. This particular method may be carried out by the access device. The method includes sending, from an access device, a request to a resource through a network (310). In one embodiment, the resource comprises a webpage or a web service, while in another embodiment the resource comprises a private network. The access device can comprise any computer system, including a laptop computer, a tablet computer, a smart phone, a PDA, and/or the like. Generally, the network will be the Internet; however, the network may also comprise a private network, a LAN, a wireless network, and/or the like. In one embodiment, the request comprises a user clicking on a button provided on a website, the button executing JavaScript to begin the authorization procedure. The button may include text or logos that identify the identity repository.

The method also includes accessing a resource challenge (312). In one embodiment, the resource challenge comprises a JSON-formatted challenge that may comprise a nonce (an arbitrary number used only once in a cryptographic communications). The nonce can be a representation of the time of the transaction with sufficient resolution that all requests will have a different timestamp. The nonce can also be a 128-bit pseudorandom value that will statistically never have multiple nonce values collide. The nonce can be used both to avoid replay attacks and as a session token during the authentication flow. The resource challenge may be included in a data packet with other values, such as the resource's domain name (RPDN). The data packet may further include a list of attribute profile names that are being requested by the resource (ATTR). The attribute profile names may be formatted as a comma-separated list. The data packet may further include a callback URL to which a response should be posted (CALLBACK).

The data packet may further include a set of requirements for an LoA mode requested by the resource (AUTHN). This can set the minimum requirements for authenticating this transaction. An LoA mode set by the user or by the identity repository can increase, but not decrease these requirements, according to one embodiment. The LoA mode can be represented using a bitmap containing flags, such as a flag indicating whether a confirmation is required from a control device, whether a PIN is required from a control device, whether a password is required on an access device, whether a PIV card is present, and/or the like.

In some embodiments, the resource challenge may be generated by the resource and transmitted from the resource to the access device. In other embodiments, the resource challenge may be generated by the access device itself. The resource challenge may be in a format that is known to be acceptable to the resource. For example, the resource challenge may be a predetermined data packet with a date and time stamp. In some embodiments, the resource challenge may be comprised of details of the transaction, such as a purchase item and other purchasing information. The resource challenge may be any format that can uniquely identify a particular transaction, and thus need not be generated by the resource itself. As used herein, the term "accessing" a resource challenge may include resource challenges that are received from the resource, received from another source, and/or generated by device accessing the resource challenge.

The method additionally includes sending the resource challenge to an identity repository (314). In one embodiment, the access device may additionally provide an interface for the user to select a user account. Interface may present a list of registered users from which the user may select his/her account. The interface may also provide an option to add a new user to the list of users authorized and the access device.

In one embodiment, the access device may package the resource challenge in a second data packet before it is sent to the identity repository. The second data packet may be encrypted deterministically using a known algorithm, such as SDK, and converted into a base-64 format. The second data packet may include the resource's domain name, the hostname from the callback URL (SITE) and a list of attribute names requested by the resource. In one embodiment, the list of attribute names may be converted into a list of individually-encrypted and base-64 converted attribute names (EATTR). This may allow the identity repository to look up individual attributes without needing to decrypt their names at the identity resource.

The second data packet may further include a "cross" Boolean value that is true if the hostname from the callback URL is not a hostname within the resource's domain name (CROSS). In one embodiment, the access device constructs a JSON object to send to the identity repository. The JSON object may include the contents of the second data packet, including an encrypted domain name, the hostname from the callback URL, the cross value, the nonce, the individually-encrypted attribute names, the LoA mode requirements, the Global User ID (GUID) for the user, the Device ID (DEVID), and a sequence value assigned to the transaction. In other embodiments, the second data packet may additional values or may omit some of the values listed above. The JSON object may further include a signature using the Access Device Signature Key Pair (ADS) listed in Table 1.

At this point, the access device may occasionally require additional information from the resource. For example, the access device may request information from the resource indicating whether or not the access device is registered with the resource. The access device may derive the site-specific User ID (UID) for use in the transaction with the resource. In one embodiment, the UID may be derived using the resource's domain name along with the Access Master Key (AMK) from Table 1. Note that this value may be the same every time the access device transacts with the particular resource. The resource can look up the LID and send an indication of whether or not the account is registered with the resource. The access device can then forward this indication to the identity repository.

The method further includes receiving, from the identity repository, a first signed resource challenge (316). In one embodiment, the first signed resource challenge is signed by the identity repository. The operations of the identity repository for signing the first resource challenge will be described in more detail below in relation to FIG. 4. The first signed resource challenge can be signed using a private key stored/derived at the identity repository that is associated with a public key stored by the resource. For example, if the resource challenge comprises a nonce, the signed resource challenge can comprise the nonce signed by the Repository Identity Signature Key Pair (RIS) listed in Table 1.

In one embodiment, the first signed resource challenge may be included in a third data packet. The third data packet may include the signed nonce, along with a set of name/value pairs for any requested and authorized attributes. The name/value pairs can be associated with the list of attribute names sent in the second data packet to the identity repository. For example, the list of attribute names might include a reference to a field named "address." In response, the third data packet returned from the identity repository may include a name/value pair comprising "555 Hollywood St." In order to maintain security, the name/value pairs can be encrypted at the identity repository and later unencrypted only at the access device or the resource.

In one embodiment, the third data packet from the identity repository further includes the public key associated with the RIS that was used to sign the nonce. In some cases, it may be necessary to send the encrypted nonce along with the public key to the resource. This may be true if this is the first interaction with the resource or if the resource has lost the public keys associated with the GUID.

The method also includes signing the resource challenge to generate a second signed resource challenge (318). In one embodiment, the access device decrypts the list of name/value pairs and uses the Access Identity Signature (AIS) private key to sign an object including the hostname from the callback URL and the nonce. In one particular embodiment, the AIS key pair is not stored on the access device but is rather derived when needed. The AIS key pair may be derived using a key derivation function (KDF). The KDF can use at least the Access Device Key (ADK) and the resource's domain name to derive a private and public key for each resource.

The KDF may be used to generate key pairs for signing and verifying the resource challenge. It may be useful to derive keys as they are needed rather than store them in order to save memory space and enhance security. This may be particularly true for keys used to sign the resource challenges, which will exist for each user-resource pair. In one embodiment, the access device public key and the identity repository public key can be associated exclusively with each resource. Access devices with numerous users and numerous websites could otherwise end up storing thousands of large encryption keys. Although many KDFs exist, the KDF used by one particular embodiment comprises the feedback mode specified in NIST SP800-108 section 5.2 using HMAC-SHA256 as its PRF As input arguments, this KDF uses a master key (such as the ADK or the RUK), a label comprising a short string differentiating the purpose of different derived keys from the same master key, a context string indicating the resource name or purpose that is unique to each key to be generated, an initialization vector that may be set to zero, and a number of output bits (normally 128 bits for symmetric keys, and 256 bits for ECDSA private keys). For example, the AIS private key could be derived with a function call comprising "KDF" (ADK, "ais", "www.domain_name.com", 256).

In one embodiment, the access device may determine whether a particular LoA mode requirement has been met before signing the resource challenge. The LoA requirement may originate with the resource, the access device, the identity repository, or set of user preferences stored on the access device or at the identity repository. For example, the access device may require a PIN be received from a control device before it will sign the resource challenge. In another example, a user preference may specify that a password be entered for transactions exceeding a dollar threshold amount. Unless a correct password is received from a user, the access device may refuse to sign the resource challenge.

The method additionally includes sending an authorization for the virtual identity to the resource through the network (320). In one embodiment, the authorization includes the first signed resource challenge and the second signed resource challenge. The first signed resource challenge may comprise the signed nonce from the identity repository, and the second signed resource challenge may comprise the signed nonce from the access device. In one embodiment, a public key associated with each signed resource challenge is also sent to the resource. This may include the AIS public key from the access device and the RIS public key from the identity repository. These public keys are typically not required by the resource; however, sending them with the signed resource challenges may be useful during a first transaction or in cases where the resource no longer has access to these public keys. This may eliminate future communications that would otherwise need to take place to transfer the public keys.

In one embodiment, the method may additionally include operations for registering an account with the resource. These operations may take place before the steps of method shown in FIG. 3 are executed. For example, registering with the resource may include sending an access device public key to the resource, as well as sending an identity repository public key to the resource. As described earlier, the access device public key can be associated with an access device private key that is used by the access device to sign the resource challenge (i.e., the AIS key pair). Similarly, the identity repository public key can be associated with an identity repository private key that is used by the identity repository to sign the resource challenge (i.e., the RIS key pair). In one embodiment, the access device public key and the identity repository public key are sent to the resource as a part of a registration process prior to the request. Again, these public keys may be sent to the resource along with the signed resource challenges as part of a first transaction.

In one embodiment, authorizing the transaction may further require an OOB authorization. This may comprise obtaining a signature of the resource challenge by another user device, namely a control device. Like the access device, the control device may comprise any computer system, such as a smart phone. In one embodiment, the access device and the control device may be the same physical device. For example, the access device may be a smart phone where the user is operating a web browser to access a website. The control device can be the same smart phone, and the request for the resource challenge may be sent to an app operating on the smart phone or to another browser window.

The identity repository may determine that an authorization is required from an OOB device. In this case, the method may further include receiving a third signed resource challenge from the identity repository, where the third signed resource challenge comprises the resource challenge signed by a control device. The method may also include sending the third signed resource challenge to the resource through the network to authorize using the virtual identity for an interaction with the resource. The operation of the control device will be discussed in greater detail below in relation to FIG. 5.

Figure 4:
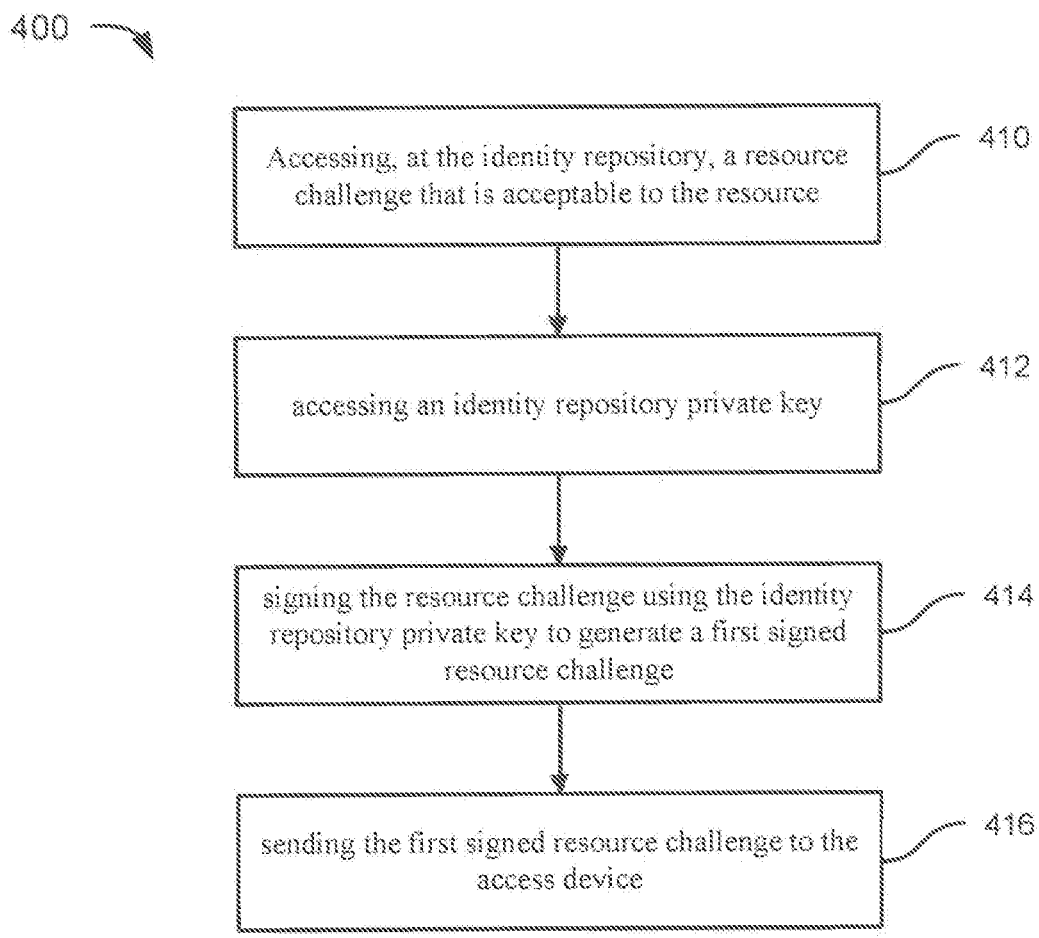
FIG. 4 illustrates a simplified flowchart illustrating a method of authorizing a virtual identity by an identity repository for an interaction between an access device and a resource, according to one embodiment.

Next, the operations performed by the identity repository will be described. FIG. 4 illustrates a simplified flowchart 400 illustrating a method of authorizing a virtual identity by an identity repository for an interaction between an access device and a resource, according to an embodiment of the present invention. The method includes accessing, at the identity repository, a resource challenge that is acceptable to the resource (410). Typically, the access device first receives the resource challenge from the resource. This may be the same resource challenge that was, or will be, signed by the access device. The resource challenge may be generated by the resource and sent from the access device, generated by the access device, and/or generated by the identity repository.

In one embodiment, an encryption key and the resource challenge are received as part of the data packet from the access device. The data packet may further include the data described above that was sent from the access device in relation to FIG. 3. For example, the data packet may include the hostname from the callback URL, the resource's domain name, and a list of attribute names. Each of these values, including each of the attribute names, can be encrypted deterministically using SDK and converted into, for example, a base-64 format. The data packet may further include the Boolean cross value, the nonce, the LoA mode requested by the resource, the GUID, the DEVID, and the sequence value assigned to the transaction.

Continuing with this particular embodiment, the identity repository can verify that the DEVID corresponds to an access device enrolled with the identity repository and associated with the GUID. The identity repository can also verify that the GUID and the DEVID have not been disabled. Furthermore, the identity repository can check the sequence value transmitted from the access device to a sequence value stored in the identity repository and associated with the DEVID. If the received sequence value matches the stored sequence value, the stored sequence value can be incremented. In one embodiment, the data packet sent from the access device can be in the form of a JSON object that is encrypted using the ADS private key. The identity repository can verify the signature on the request using the ADS public key stored in the repository for the GUID.

In some embodiments, circumstances may cause the identity repository to require additional information from the access device. For example, the Boolean cross value represents a determination as to whether the hostname from the callback URL is not a hostname within the resource's domain name. If the Boolean cross value is true, the identity repository can look up the resource's domain name in a relationship table associated with the user to determine whether a relationship has been previously established between the callback URL and the resource's domain name. If no relationship has been established, the access device may need to provide confirmation that the user is willing to share the UID, along with public keys and attributes with a site in a different domain. In one embodiment, the access device can receive this indication from the identity repository and prompt the user to confirm their willingness to share information associated with the resource with the callback URL. If the user declines, the authentication process can end.

In one embodiment, the identity repository can both select and enforce the proper LoA mode requirements. LoA modes may be specified by the resource, the access device, the identity repository, and/or user preferences stored on the identity repository. The identity repository can select which of these LoA modes should be enforced on the transaction. For example, the identity repository may determine that the most restrictive, or highest, LoA requirement should be enforced.

In one embodiment, the LoA mode may require that a user provides a password to the access device in this case, the identity repository can return an HTML response, such as a "202 Accepted" status response with a JSON object containing a password nonce corresponding to the authentication. The user can provide the password to the access device, which then signs the password nonce using the password, and returns the signed password nonce to the identity repository for verification.

In one embodiment, the architecture is set up so that all of the user data stored at the identity repository is encrypted, while the encryption key is stored locally on the user's device. This creates an arms-length separation between the data and the means for accessing the data. Even if the user's device were compromised, the attacker would not have access to the encrypted data because it is securely stored at the identity repository. More importantly, an attacker breaching the identity repository would not gain any useful information because any data stored therein would be encrypted, and the associated encryption keys would be stored on the individual users' devices. This prevents massive data compromises from resulting from a single security breach at the identity repository. In one embodiment, the identity repository is a fully encrypted data store, and any data stored thereon is encrypted. The associated encryption keys are stored remotely in other locations and on other devices that are not controlled or operated by the identity repository.

Regarding the attributes fields, the encryption takes place on the user device. The request does not need to include a key to decrypt the field values at the identity repository. A user module operating on the access device can be configured to encrypt a field associated with the request from the resource. The encrypted field is then sent to the identity repository. The identity repository is further configured to retrieve the encrypted data by comparing the encrypted data to the encrypted field. For example, to represent a name, the data associated with the information includes a field-value pair of <name><"Steve">. If the resource only needs the user's name, then the access device can encrypt the field value of "name" and send this to the identity repository. The identity repository can then compare the encrypted "name" fields with the other encrypted fields in the encrypted data and return only the associated encrypted value ("Steve"). In another embodiment, the access device simply requests all of the encrypted data.

The method also includes accessing an identity repository private key (412). In some embodiments, the identity repository private key may be accessed using the encryption key that may have been received from the access device. The terms "encryption key" and/or "cryptographic key" may describe both a key and/or information used to generate a key by a KDF. In one embodiment, the identity repository may decrypt the identity repository private key using the encryption key sent from the access device. In another embodiment, accessing the identity repository private key may comprise deriving the private key using the KDF function described earlier. For example, the encryption key sent from the access device may be the encrypted domain name of the resource. The encrypted domain name can be used as a parameter in the KDF function, along with the Repository User Key (RUK) listed in Table 1 and stored on the identity repository.

The method additionally includes signing the resource challenge using the identity repository private key to generate a first signed resource challenge (414). In one embodiment, the identity repository can use the identity repository private key derived from encrypted domain name of the resource by the KDF function to sign the nonce sent from the resource. Additionally, in order to enforce the appropriate LoA mode requirements, the identity repository may refuse to sign the resource challenge if one or more of the LoA mode requirements are not met. For example, if the LoA mode specified by the resource requires a password from the user, and the password entered was incorrect, the identity repository can refuse to sign the resource challenge. Consequently, the resource can have confidence that the specified LoA mode has been honored if it receives a signed resource challenge from the identity repository.

The method further includes sending the first signed resource challenge to the access device (416) The first signed resource challenge may be sent as part of yet another data packet that includes the encrypted name/value pairs for the requested and authorized attributes, along with the identity repository public key. The identity repository public key can be associated with the identity repository private key used to sign the resource challenge Again, the public keys will typically be stored at the resource but may be sent with the signed resource challenge as a precaution or if this is the first time the access device is using this identity with the resource.

In some cases, the LoA mode (as specified by the resource, access device, or preferences stored by the identity repository) may require an OOB authorization. In one embodiment, this may correspond to receiving an authorization and/or a PIN from a control device, such as a smartphone. Therefore, the method may optionally further include sending the resource challenge to a control device and receiving a signed resource challenge, sometimes referred to as the "third signed resource challenge," from the control device. The identity repository can then send the third signed resource challenge to the access device, which can subsequently forward the third signed resource challenge to the resource.

In one embodiment, multiple control devices can be associated with a single user account. In this case, the identity repository can issue push notifications to all control devices associated with the user account. Alternatively, the identity repository can issue push notifications to a preferred subset of the control devices specified by the user preferences. If an OOB authorization is required, and no control devices are registered with the account, the identity repository can return, for example, a "403 Forbidden" error message to the access device.

After the push notifications have been sent to one or more of the registered control devices, the identity repository can await a connection from any of the control devices. In one embodiment, the connection can be in the form of a signed POST containing a signed JSON-formatted object containing the GUID of the user, the DEVID of the device, and a sequence number. The JSON-formatted object can be signed using the Control Device Signature key (CDS) from Table 1. The identity repository can then verify the signature of the JSON-formatted object. Additionally, the identity repository can verify that the DEVID corresponds to a current control device that is associated with the GUID and that the sequence number matches a value stored by the identity repository for this control device.

If any of these verifications fail, the identity repository can return a "403 Forbidden" error to the control device and/or the access device. If all of these verifications are successful, then the identity repository can increment the stored value for the sequence number for this DEVID. Next, the identity repository can send a packet of information to the control device for authorization. In one embodiment, the packet of information can include one or more of the following: the nonce, the encrypted domain name, the encrypted callback URL, the LoA mode, and/or the Boolean value indicating whether the user has previously registered with the resource.

The packet of information may also include a new nonce used for PIN verification with the control device. If the LoA mode requires a PIN to be entered at the control device, the control device can make such request from the user. For example, the control device can display the resource's domain name to the user, along with a prompt to enter a pin authorizing the transaction. The control device may accept the PIN from the user and may then sign a packet comprising at least the new nonce using the PIN. In one embodiment, the PIN is "salted" with a value that is known by the identity repository, and the result is used to sign the packet. This can effectively eliminate the threat of a brute force attack against the PIN, which may in turn allow a user to use shorter and/or more easily guessed PINs. This also prevents the actual PIN from needing to be stored anywhere other than the control device and eliminates the need to transmit the PIN between the control device and the identity repository.

The signed packet comprising at least the new nonce can then be sent from the control device to the identity repository. The identity repository can then verify the signature. Again, if the control device denies the authentication or the PIN verification fails, the identity repository can return, for example, a "403 Forbidden" error to the access device. If the control device approves the authentication and the PIN verification is successful, then the control device can access or derive the private key of the Control Identity Signature keypair (CIS) from Table 1. In some embodiments, this private key is not stored on the control device Instead, this private key is derived using a key derivation function with the Access Device Key (ADK) and the resource's domain name as inputs. If the Boolean value indicating whether the user has previously registered with the resource is false, then the control device can derive the public key for the CIS keypair as well.

The control device can then sign the nonce with the CIS private key and return the signed nonce (the third signed resource challenge) to the identity repository. In one embodiment, the control device can also use the CIS private key to sign an object that contains the nonce, along with the hostname from the callback URL Additionally, the control device can send the CIS public key to the identity repository.

Figure 5:
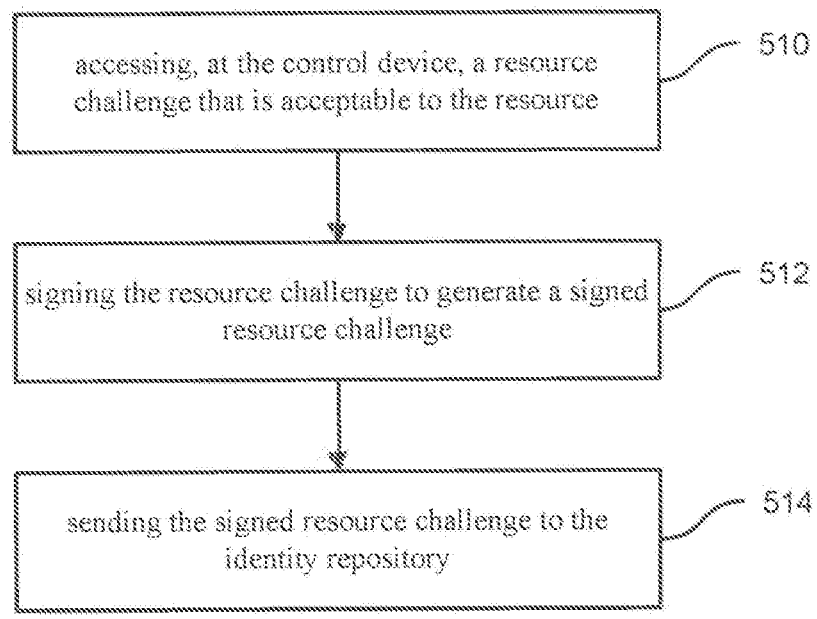
FIG. 5 illustrates a simplified flowchart illustrating a method for authorizing a virtual identity using a control device for an interaction between an access device and a resource, according to one embodiment.

Turning now to a discussion of the transaction from the perspective of the control device, a software module may operate on the control device to perform the functions described above. In one embodiment, the control device may comprise a smart phone. The smart phone may include an application ("app") that operates on the smart phone. The app may be made available for download to the smart phone via an online app store. An entity associated with the identity repository may provide the app to the online app store, which in turn may provide the app to the control device of the user. FIG. 5 illustrates a simplified flowchart 500 illustrating a method for authorizing a virtual identity using a control device for an interaction between an access device and a resource, according to an embodiment of the present invention. The method includes accessing, at the control device, a resource challenge that is acceptable to the resource (510). According to one embodiment, the resource challenge can originate with the resource. As described above in relation to FIG. 3 and FIG. 4, the resource challenge may comprise a nonce and may be sent along with additional data fields, such as the resource's domain name. In other embodiments, the resource challenge can originate with the control device, the access device, and/or the identity repository. In order to be acceptable to the resource, some embodiments may use resource challenges that can semi-uniquely identify a transaction.

The method may also include signing the resource challenge to generate a signed resource challenge (512). In some embodiments, this may be referred to as the third signed resource challenge. The resource challenge may be signed using the procedure described in relation to FIG. 4.

In one embodiment, the control device can prompt the user to authorize the transaction. Information describing the interaction between the access device and the resource can be received by the control device. For example, the information might include a description of a purchase transaction comprising a product, a vendor, a price, and so forth. The control device can provide an indication to the user that includes the information describing the interaction. For example, the control device can display a pop-up window illustrating the interaction details and may provide a means for the user to either authorize or reject the interaction. In response, the control device can receive an indication from the user that grants permission to use the virtual identity in the interaction between an access device and a resource. Alternatively, the user may reject the request to authorize the interaction.

In addition to authorizing the interaction, the user of the control device may be required to prove that they are present and/or authorized to use the control device, according to one embodiment. Therefore, the method may further include operations for receiving a PIN, cryptographically salting the PIN, and using the results to sign a new nonce sent from the identity repository. Specifically, the method may include receiving a control device challenge from the identity repository, receiving a personal identifier from a user, signing the control device challenge using at least the personal identifier to generate a signed control device challenge, and sending the signed control device challenge to the identity repository to verify that the control device is authorized to sign the resource challenge. One embodiment describing this process is also discussed above in relation to FIG. 4.

According to one embodiment, the personal identifier that is received from a user may comprise a PIN. However, in other embodiments, the personal identifier can comprise any token associated with the user, such as a password, hardware dongle, flash drive, and/or the like.

The method further includes sending the signed resource challenge to the identity repository (514). As described above, the signed resource challenge may be sent as a part of a larger data packet including additional data. The larger data packet may be signed using the CIS private key. The larger data packet may also include the CIS public key.

Figure 6:
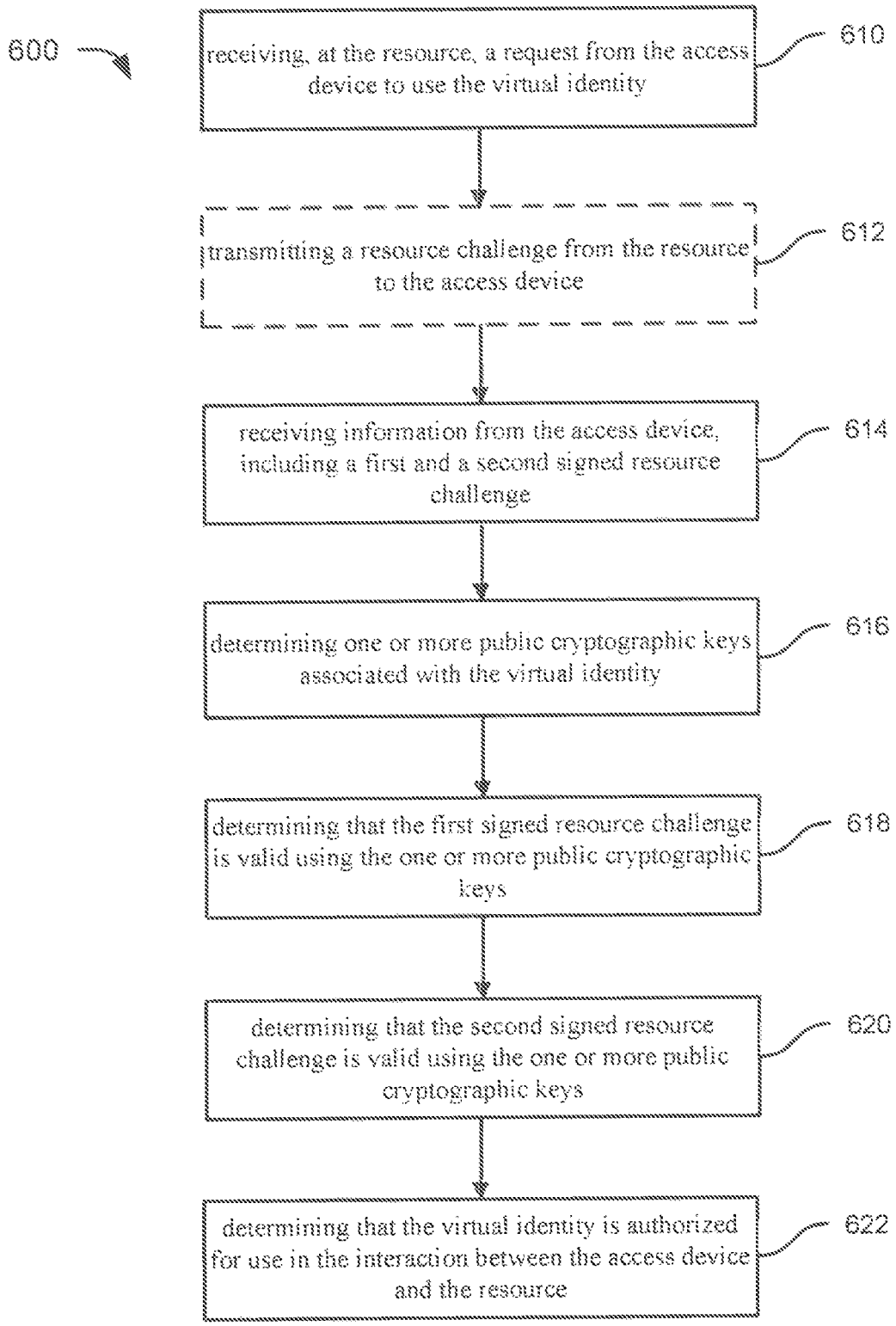
FIG. 6 illustrates a simplified flowchart illustrating a method of verifying, by a resource, that a virtual identity is authorized for use in an interaction between an access device and the resource, according to one embodiment.

Turning now to discussion of the transaction from the perspective of the resource, a software module may operate on a server to interact with the access device FIG. 6 illustrates a simplified flow chart illustrating a method of verifying, by a resource, that a virtual identity is authorized for use in an interaction between an access device and the resource, according to an embodiment of the present invention. The method may include receiving, at the resource, a request from the access device to use the virtual identity (610). In one embodiment, the resource may be a website, and the website can provide a button that allows a user to, with a single click, log into the website using the identity management system. The button can replace, or can be displayed alongside with, traditional username and password HTML fields.

In some embodiments, in response to receiving the request, the method may also include transmitting a resource challenge from the resource to the access device (612). As described above, in one embodiment the resource challenge may comprise a nonce. The resource challenge may also be sent as part of a larger data package. The larger data package may additionally comprise the resource's domain name, names and attribute profiles that are being requested by the resource, an LoA mode, and/or a callback URL to which the response should be POSTed when the authentication completes. In one embodiment, the callback URL can be an SSL (https) URL. The resource challenge or other information sent in the optional larger data package can be used by the access device to generate signatures for authorization. Note that in other embodiments, transmitting a resource challenge from the resource to the access device may not be necessary. In these embodiments, the resource challenge may be derived or generated at the access device.

The method can also include receiving information from the access device (614). According to one embodiment, the information may comprise a first signed resource challenge signed by an identity repository and a second signed resource challenge signed by the access device. The first signed resource challenge and the second signed resource challenge can be signed by the identity repository and the access device, respectively, in a number of different ways. The first signed resource challenge and the second signed resource challenge can be based on a resource challenge that is acceptable to the resource. The resource challenge may be generated at the resource, at the access device, or at other devices in the identity management system. In one embodiment, the first signed resource challenge and the second signed resource challenge may be signed as described above in relation to FIG. 3 and FIG. 4.

In one embodiment, the LoA mode transmitted by the resource to the access device can specify that and OOB authorization should occur. For example, the LoA mode may specify that a PIN should be received by a control device. In this embodiment, the information received from the access device may additionally comprise a third signed resource challenge that was signed by the control device. Again, the third signed resource challenge may be signed as described above in relation to FIG. 3 and FIG. 4.

The method may further include determining one or more public cryptographic keys associated with the virtual identity (616) In one embodiment, the one or more public cryptographic keys were previously transmitted to the resource as part of a registration process. In other words, the public and private key pairs used to sign resource challenges for the resource may have been derived earlier by the access device, the identity repository, and/or the control device. When registering with the website, the one or more public cryptographic keys may have been transmitted to the resource and stored at the resource for subsequent authorizations. In one embodiment, the first time a user attempts to access a resource using the virtual identity, this action may automatically include a registration process with the website where the one or more public cryptographic keys are transmitted. To determine which public cryptographic keys are associated with the virtual identity, the resource can, for example, store the one or more public cryptographic keys for all of its customers in a table that is indexed by the user's UID.

In another embodiment, the resource may not have the one or more public cryptographic keys stored locally. As described above, the information received from the access device may include the one or more public cryptographic keys that can be used to verify the signatures on the signed resource challenges. In this case, determining the one or more public cryptographic keys associated with the virtual identity may simply comprise using the one or more public cryptographic keys that were sent with the information from the access device.

The method may additionally include determining that the first signed resource challenge is valid using the one or more public cryptographic keys (618) and determining that the second signed resource challenge is valid using the one or more public cryptographic keys (620). In one embodiment, a nonce sent by the resource to the access device may have been signed by both the access device and the identity repository. In another embodiment, the nonce may be part of a larger data package, which has been signed by both the access device and the identity repository. In another embodiment, a separate copy of either the nonce or the larger data packet may have each been individually signed by the access device and/or the identity repository. Determining that the signatures are valid may include decrypting the nonce and/or larger data packet using the one or more public cryptographic keys that were previously determined.

In embodiments where an OOB authorization was required, the method may additionally include determining that the third signed resource challenge is valid using the one or more public cryptographic keys.

The method may also include determining that the virtual identity is authorized for use in the interaction between the access device and the resource (622). For example, if the two/three signatures all are determined to be valid, the virtual identity can be authorized. In one embodiment, the identity repository can be used to enforce any LoA mode requirements specified by the resource. For example, one of the requirements may include verifying that a personal identifier has been received from the access device to verify that the access device has been authorized by a user to sign the resource challenge. If the resource determines that the signature provided by the identity repository is valid, then the resource can be assured that such a personal identifier was provided and determined to be valid by the identity repository. In other words, the identity repository can withhold its signature unless the LoA mode requirements have been met. As described above, the LoA mode requirements to be enforced may be selected from those provided by the resource, the access device, the control device, or according to user preferences stored at the identity repository.

It should be appreciated that the specific steps illustrated in FIGS. 3-6 provide particular methods of authorizing the use of a virtual identity according to various embodiments of the present invention. Other sequences of steps may also be performed according to alternative embodiments. For example, alternative embodiments of the present invention may perform the steps outlined above in a different order. Moreover, the individual steps illustrated in FIGS. 3-6 may include multiple sub-steps that may be performed in various sequences as appropriate to the individual step. Furthermore, additional steps may be added or removed depending on the particular applications One of ordinary skill in the art would recognize many variations, modifications, and alternatives.

In order to clarify the order of the transaction flows described in FIGS. 3-6, FIG. 7 illustrates a simplified flowchart 700 of communications within a system for online identity management, according to one embodiment. Flowchart 700 is not meant to be exhaustive, and a number of possible transactions, including some described elsewhere herein, have been left out for brevity. In one embodiment, a series of transactions may begin with the resource 702 sending at least a resource challenge to the access device 704 (710). In one embodiment, JavaScript can be retrieved from the identity repository 706 (712) that can be used to deterministically encrypt using the SDK data packet to be sent from the access device 704 to the repository 706. Where multiple user accounts exist on the same access device, the access device 704 can present a user list to the user (714). In response, the user may enter a selection from the user list to the access device 704 (716).

Using the selected user account, the access device 704 can send at least the resource challenge and a value for decrypting information stored in the identity repository 706 to the identity repository 706 (718). In one embodiment, the access device 704 can send one or more decryption keys to decrypt information on the identity repository. Alternatively, the access device 704 can send information to be used to generate one or more decryption keys to the identity repository 706.

In cases where the chosen LoA mode requires authorization and/or a personal identifier to be received by the access device 704, the identity repository 706 can send an access device challenge to the access device 704 (720). The access device may prompt the user for authorization (722). The user can provide a response that either authorizes the virtual identity or transaction or rejects such (724). Additionally or alternatively, the access device 704 may provide a user prompt for a personal identifier, such as a password (726). In response, the user may provide a personal identifier to the access device 704 (728). The password may be salted according to the methods described elsewhere in this disclosure and used to provide an authentication to the identity repository 706 (730).

In embodiments and situations where an OOB authorization is required, the resource challenge can be sent from the identity repository 706 to the control device 708 (732). The control device 708 may prompt the user for a PIN (736). In response, the user may provide a PIN to the control device 708 (738). The control device may then send the signed resource challenge to the identity repository 706 (740).

After the identity repository 706 has determined that all of the LoA requirements have been satisfied, the identity repository 706 can send at least the esource challenges that have been signed by the control device 708 and the identity repository 706 (742). The access device 704 can forward the signed resource challenges received from the identity repository 706 along with the resource challenge that has been signed by the access device 704 itself to the resource 702 (744).

Figure 7:
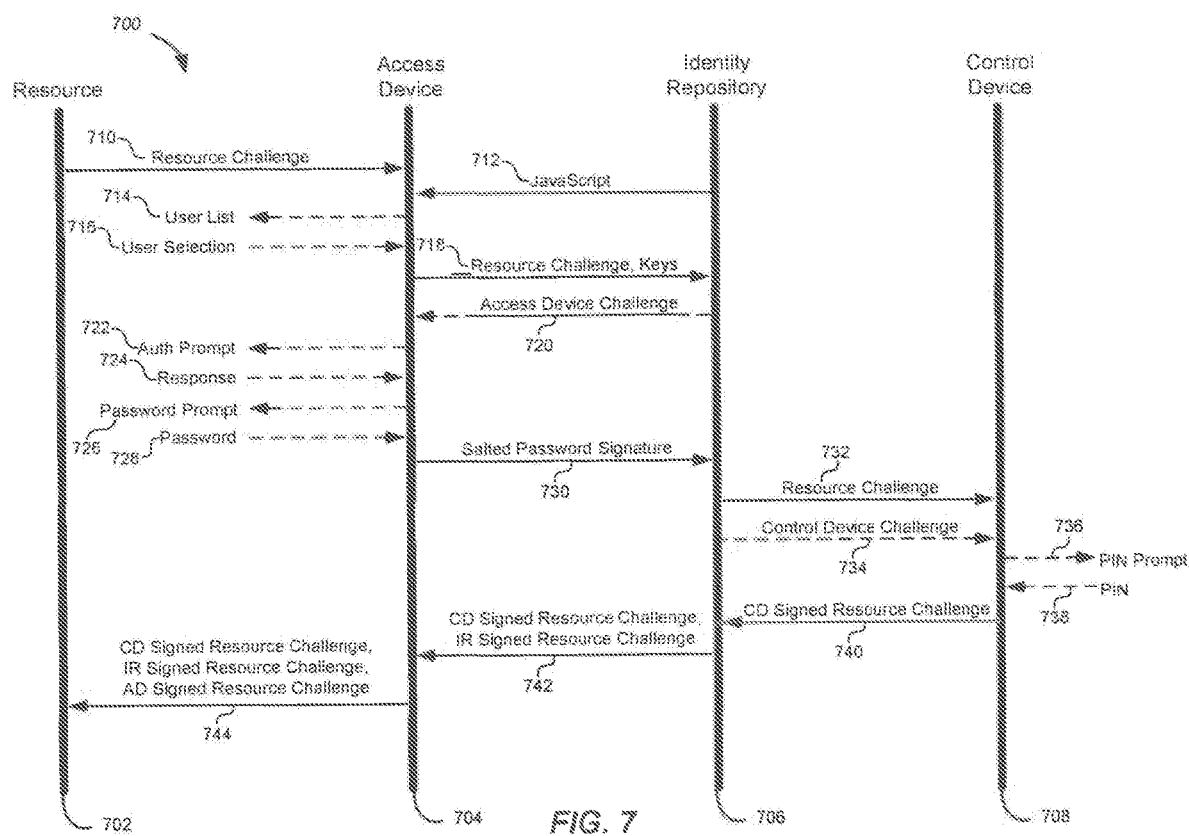
FIG. 7 illustrates a simplified flow diagram of communications within a system for online identity management, according to one embodiment.

It should be noted that multiple parts of the transactions described in this disclosure have not been included in FIG. 7. For example, the control device 708 may prompt the user for authorization of the transaction or use of the virtual identity. In response, the user may provide such authorization. Also, more information than has been described or shown may be passed between the different entities during a transaction. For example, the resource challenge may be transmitted as part of a larger data packet that includes additional data fields that can be used by each entity, such as the resources domain name, a list of attributes, and/or the like.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

Pairing Unregistered Devices

Some embodiments of the present invention relate to technologies to facilitate pairing unregistered devices with an existing virtual identity. Technologies related to embodiments of the present invention provide a method and system for transferring secret data to the unregistered device as a part of the registration process, without exposing the secret data to any of the intermediary repositories. Also provided are methods and systems for verifying the identity of a user of the unregistered device, again without exposing a passcode, such as a password and/or PIN, to any of the intermediary repositories.

Consistent with the remainder of this disclosure, a virtual identity may be managed and used by a number of different devices. According to one embodiment, the virtual identity may be managed by an identity repository. The identity repository may include one or more servers operating at a location that is geographically remote from most user devices. In one embodiment, the identity repository may store information associated with the virtual identity of each user in an encrypted format, such that if the identity repository is compromised, the personal information of each user remains secure. Therefore, the means by which the personal information can be decrypted, such as a decryption key, can be stored in a separate location away from the identity repository.

In one embodiment, the identity repository may be authorized to communicate with one or more user devices that are registered with a particular virtual identity. By way of example, the identity repository may be associated with a number of access devices and/or a number of control devices associated with each virtual identity. In order to use the virtual identity in a transaction, a user may provide identifiers and/or credentials to the identity repository in order to gain the signature of the identity repository or to retrieve any of the personal data in its encrypted format. For example, the identity repository may sign digital challenges provided by relying parties, such as websites participating in the transaction.

As part of this process, the identity repository may need to identify a device being used in the transaction. For example, a user may log onto a retail website using a desktop computer. In this case, the desktop computer could be considered an access device. The retail website may provide a challenge to be signed by the access device and by the identity repository. When the access device passes the challenge to the identity repository for a signature, the access device can also provide a user identifier and/or a device identifier. The identity repository can then use the identifier(s) to access a particular virtual identity stored at the identity repository. If the identity repository is unable to identify the access device using the provided device identifier, then the identity repository may refuse to provide a signature.

Verifying the device identifier for any or all devices used in a transaction can be an important way of preventing fraud. For example, in order to access a virtual identity, both a valid user identifier and a valid device identifier can be presented, in addition to any other signatures required by the virtual identity. If a valid user identifier is detected without a valid device identifier, this may indicate that someone may be attempting to use a virtual identity without authorization. Therefore, a method for securely registering user devices with a virtual identity is presented below.

When registering a new user device, it may be important to adhere to the principles that contribute to the security of the virtual identity itself. First, encrypted data should be stored separately from the cryptographic keys that can be used to access the encrypted data. Keys should not be transmitted with encrypted data, nor should both the keys and the data be accessible to an intermediary at anytime. Specific to one embodiment, the keys for decrypting data stored on the identity repository should not generally be accessible to the identity repository. Furthermore, keys used by each user device to sign challenges during a transaction should also not be accessible to the identity repository Therefore, during the registration process a registered device will need to provide secret information securely to the unregistered device without exposing that secret information to the identity repository.

It typically is not feasible to ask a user to manually transfer secrets between devices by reading the secrets from one device and entering them in another device. Transferring secret information may often involve sharing cryptographic keys that can typically exceed 128 bits in length. These cryptographic keys may typically be stored in an encrypted format on registered devices, and for security reasons, should not be displayed to users. Furthermore, given the length and complexity of most cryptographic keys, manual transfer of these secrets will often involve user errors that prevent the registration process from succeeding.

Additionally, a user may have a passcode, such as a password and/or a PIN, for their associated access devices and/or control devices. Like the keys for decrypting secret data, the passcode should not be transmitted in such a way that it is exposed to an intermediary such as the identity repository. At the same time, some embodiments may require that a user verify his/her identity on the unregistered device prior to registration. For example, a user may be required to input a PIN to an unregistered control device, and that PIN may need to be verified before the control device is registered. The difficulty lies in accomplishing this verification process without exposing this information to the identity repository. Some of the embodiments described herein may solve these and many other problems.

Figure 8:
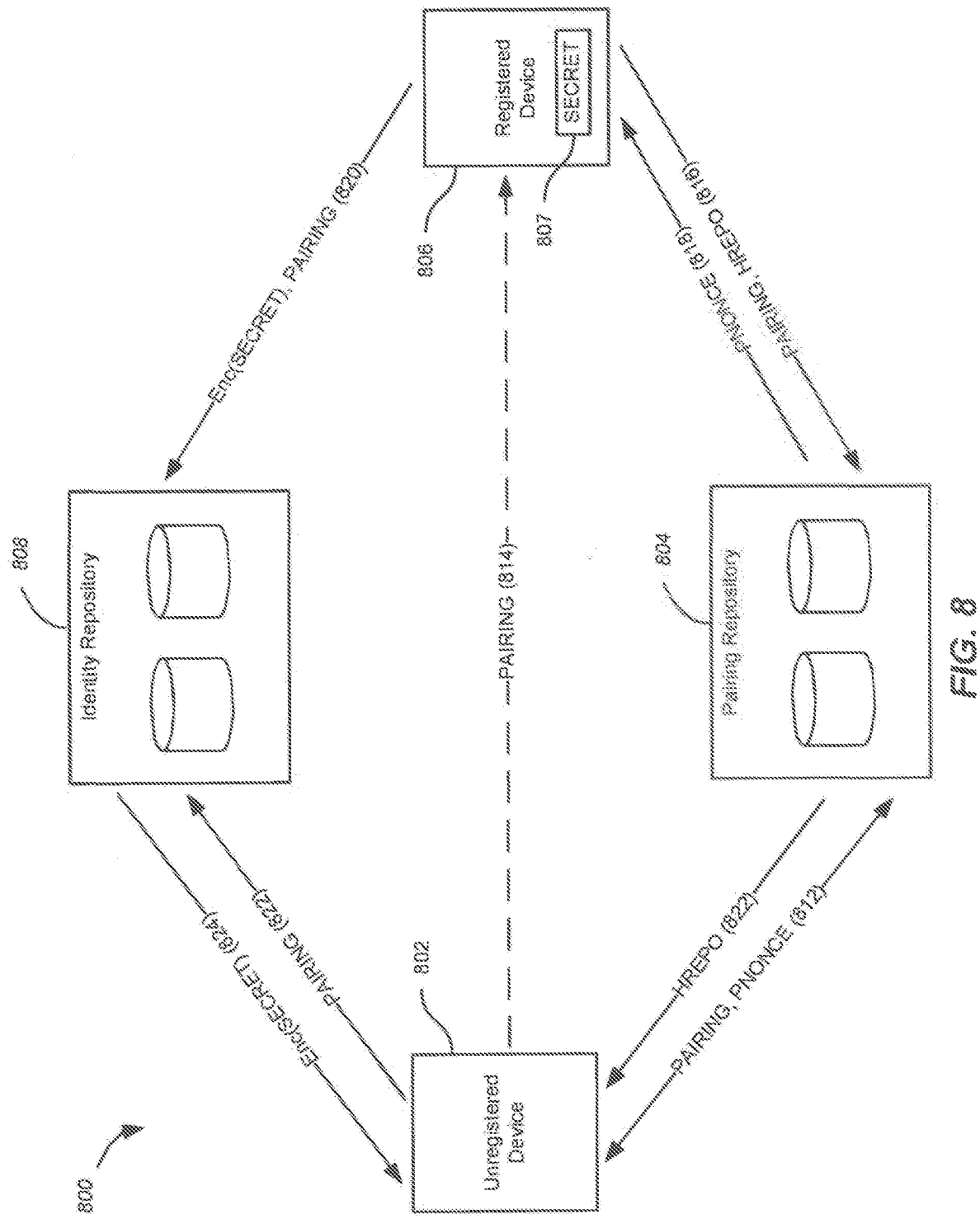
FIG. 8 illustrates a simplified block diagram of a system for registering and sharing secret information with an unregistered device, according to one embodiment.

FIG. 8 illustrates a block diagram 800 of a system for pairing and unregistered device with a virtual identity, according to one embodiment. Block diagram 800 also illustrates a subset of the possible transactions that may take place during the registration process. It will be understood that additional information may be exchanged, and additional communications may take place in various embodiments. Block diagram 800 merely represents a simplified overview to present the basic operation of various embodiments. An identity repository 808 is provided to store and manage secret information associated with a virtual identity. A registered device 806 may be registered to a user of the virtual identity, and secret information 807 may be stored on the registered device 806. In one embodiment, the registered device 806 may be categorized as an access device and may comprise a personal computer, a laptop, a tablet computer, a smart phone, a workstation, a thin client, an automated software process, and/or the like. Similarly, the user of the virtual identity may have access to an unregistered device, which may comprise any of the technologies enumerated above, along with any other computing device available to a user.

Also illustrated in FIG. 8 is an additional component referred to as a pairing repository 804. Similar to the identity repository 808, the pairing repository 804 may operate on one or more servers that can be communicatively coupled to both the registered device 806 and the unregistered device 802. According to one embodiment, the pairing repository 804 may be co-located with the identity repository 808. In another embodiment, the pairing repository 804 is located geographically remote from the identity repository 808. In another embodiment, the pairing repository 804 may be owned, associated with, or operated by, a first entity; while the identity repository 808 may be owned, associated with, or operated by, a second entity. In some embodiments, the pairing repository 804 is logically separated from the identity repository 808 such that information that is transmitted from the unregistered device 802 and/or the registered device 806 to the pairing repository 804 is not known by, or available to, the identity repository 808. In other words, information transmitted between the unregistered device 802 and the registered device 806 via the pairing repository 804 would remain secret from the identity repository 808 unless otherwise disclosed, and vice versa.

In order to transmit the secret information 807 rom the registered device 806 to be unregistered device 802, two different values may be generated for the transaction. According to one embodiment, these two values may include a pairing code (PAIRING) and a pairing nonce (PNONCE). Generally, the pairing code and the pairing nonce may be generated by either the unregistered device 802 or the pairing repository 804. Furthermore, the unregistered device 802 and the pairing repository 804 may initially share their knowledge of the pairing code and the pairing nonce (812). In one embodiment, however, the pairing code and the pairing nonce are both generated by the pairing repository 804 and transmitted to the unregistered device 802.

Next, the unregistered device 802 can display the pairing code to the user. According to one embodiment, the purpose of the pairing code may be to verify that the user of the registered device 806 also controls or has access to the unregistered device 802. The pairing code may also be used as a transaction identifier as both devices interact with the pairing repository 804 and/or the identity repository 808. Generally, the pairing code may be a short combination of letters and/or numbers that may be easily read from a screen and entered into the registered device 806. For example, the pairing code may comprise a string of digits such as "5178", or may comprise a string of mixed numbers and characters such as "5OP81Z". The user may read this pairing code from the unregistered device 802 and enter the pairing code into the registered device 806 (814).

After receiving the pairing code, the registered device 806 may then send a request to the pairing repository 804 that includes the pairing code and an identity repository locator (HREPO). In some embodiments, different organizations may operate different identity repositories, and users may transfer virtual identities between repositories. For example, a user may choose to transfer his/her virtual identity from an identity repository operated by the federal government to a repository operated by a private company Different identity repositories may operate using common software specifications, and may present a standardized API to users/devices. Therefore, it may be beneficial for the registered device to provide, for example, a URL to the pairing repository 804 that can be transmitted to the unregistered device 802 for completing the pairing process (816). If the location of the identity repository 808 is known, then this step may be omitted.

Using the pairing code, the pairing repository 804 may retrieve the pairing nonce associated with the unregistered device 802. The pairing nonce can then be transmitted to the registered device 806 (818). At this point, the registered device 806 can use the pairing code and the pairing nonce to generate an encryption key. Any key derivation function (KDF) known in the art may be used to generate the encryption key. This encryption key can be used to encrypt the secret information 807. The encrypted secret information and pairing code can then be sent to the identity repository 808 (820). Note that the identity repository 808 does not have access to the pairing nonce. Therefore, even if the identity repository 808 knows the KDF used to derive the encryption key, the identity repository 808 would be unable to do so without the pairing nonce as an input.

Next, the unregistered device 802 may optionally request and receive the identity repository locator from the pairing repository 804 (822). Using the identity repository locator, the unregistered device 802 may send a request to the identity repository 808 with the pairing code (822). Because the identity repository 808 received the pairing code from the registered device 806, the identity repository 808 can match the request from the unregistered device with the encrypted secret information from the registered device 806. In response, the identity repository 808 may provide the encrypted secret information to the unregistered device 802 (824). The KDF used to generate the encryption key may at some point be shared with the unregistered device by the identity repository 808. Therefore the unregistered device 802 can use the pairing code and/or the pairing nonce to generate a key that will decrypt the encrypted secret information sent from the registered device 806. The secret information may be stored securely on the unregistered device 802 to be used in future transactions involving the virtual identity. Finally, the identity repository 808 may associate the unregistered device 802 with the virtual identity for use in future transactions, storing a device identifier (DEVID) of the unregistered device 802. At this point the unregistered device 802 can become a registered device.

Note that in the transaction described above, one intermediary (the pairing repository 804) can be used to share the means for accessing the secret information, while another intermediary (the identity repository 808) is used to share the secret information itself. Furthermore, the unregistered device 802 is initially connected with a virtual identity when the user manually enters the pairing code into the registered device 806. Also note that passcode and/or identity verification is not illustrated in block diagram 800. Although in some embodiments password verification may be an integral part of the pairing process, these additional steps will be described separately in further detail below for the sake of clarity.

Figures 9A, 9B:
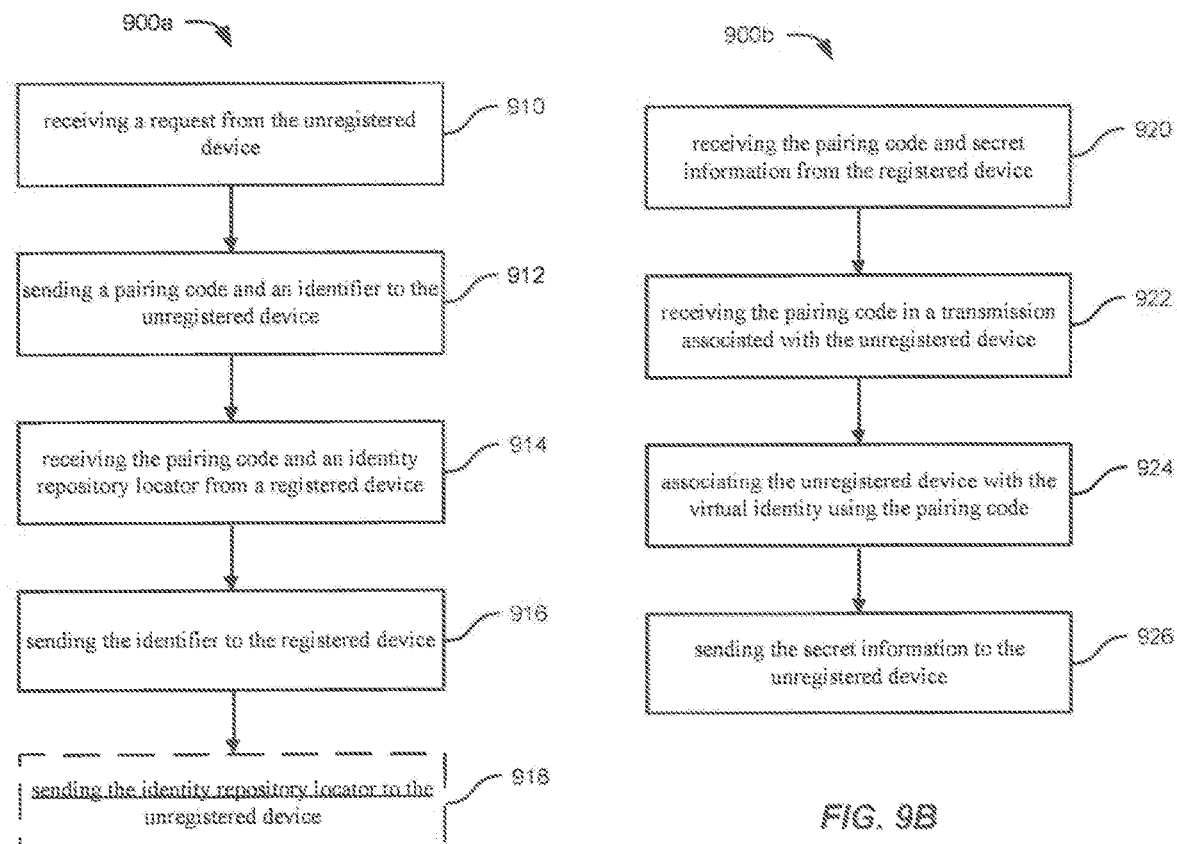
FIGS. 9A-9B illustrate simplified flowcharts of methods for registering and sharing secret information with an unregistered device, according to one embodiment.

FIG. 9A illustrates a flowchart 900a for a method of pairing an unregistered device for use with a virtual identity, according to one embodiment. The method of flowchart 900a may be carried out by a pairing repository. The method may include receiving a request from the unregistered device (910). If the device being added is an access device, the user may navigate to a webpage operated by the pairing repository that contains JavaScript and prompts the user for a device name (DEVNAME) by which the access device should be known, as well as a passcode for the user's account with the identity repository. Alternatively, if the device being added is a control device, the user may interact with an identity repository software module operating on the control device, such as an app on a smart phone. The software module may prompt the user for a DEVNAME and a passcode, such as a PIN.

The method may also include sending a pairing code and an identifier to the unregistered device (912). In one embodiment, the pairing repository may create a pairing code comprising an n-digit pseudorandom number with a check digit. In one embodiment, n is 4 If more than 50% of the space of available pairing codes is in use, then n may be incremented by 1, and a pairing code may be chosen from the expanded space. For example, for n=3, if more than 500 pairing codes were in use, then n could be incremented to expand the pairing code space to 4 digits, i.e. 9999. In one embodiment, if 50% of the space of nine-digit pairing codes is occupied, an error may be returned to the user, such as a "503 Service Unavailable" error. If pairing codes are available, the pairing repository can select a value at random from the pairing code space that is not in use. A check digit can be calculated and appended to the end of the pairing code. In one embodiment, the check digit can be calculated by applying "digit weightings", such as 3131313131, for example, and calculating the sum of each digit times its weighting, modulo 10, with leading zeros added as needed. Generally, the pairing code can be a short string of characters and/or digits that will be easy to remember and transfer between devices. Alternatively, the pairing code can be an alphanumeric combination that approximates English words or sound combinations that can be remembered by a typical user.

The pairing repository may also select an identifier to be sent to the unregistered device. In one embodiment, the identifier may comprise the pairing nonce (PNONCE) described above. Although any format or transmission method may be used to send the identifier and the pairing code to the unregistered device, one specific embodiment returns a JSON object containing the pairing code in decimal format (e.g., {"PAIRING", "55580"}) and the identifier in base-64 format.

The next steps in the registration process may take place remotely from the pairing repository. In one embodiment, the pairing code may be displayed to the user of the control device. The user of the control device may then enter the pairing code into a registered device, such as an access device. Like the control device, the access device may run a software module provided by the pairing repository or the identity repository when entering the pairing code. In another embodiment, the user of the access device may navigate to a website operated by the identity repository or the pairing repository. In response to receiving the pairing code, the registered device may send a transmission to the pairing repository. In some embodiments, the pairing code may expire after a predetermined time interval or after receiving a request from the registered device. In some embodiments, a large time delay may be acceptable, such as 1 hour, 6 hours, 12 hours, 24 hours, 36 hours, etc.

Consequently, the method may also include receiving the pairing code and optionally an identity repository locator from a registered device (914). In one embodiment, the identity repository locator may comprise the name of the user's home repository for identity management. The identity repository locator may comprise a URL or a domain name. If the pairing repository determines that the pairing code matches a valid and currently active pairing code, the pairing repository may send the identifier to the registered device (916). In one embodiment, this may comprise sending the pairing nonce to the registered device. In another embodiment, additional information may also be provided to the registered device including, a pairing type that indicates whether the unregistered device is a control device or an access device, and a device name (DEVNAME) provided by the unregistered device. Alternatively, if the pairing repository determined that the pairing code does not match a valid and/or currently active pairing code, an error may be returned to the user, such as a "404 Not Found error."

At this point, the registered device may derive an encryption key, or pairing key (KP), that can be used to encrypt secret information. In one embodiment, a KDF may be used that accepts an input comprising at least the pairing nonce. In another embodiment, the KDF may also accept the pairing code. If both the pairing code and the pairing nonce are used, these two values may be concatenated and/or combined using various known methods if the KDF only accepts a single seed input. In one embodiment, the secret information may comprise a "salt" value that is used to verify passcodes as will be described further below. The secret information may further comprise cryptographic keys that can be used to sign future transactions or to generate additional cryptographic keys that can be used to sign future transactions. In one embodiment, the secret information may comprise a Shared Device Key (SDK) that is shared between all access devices and control devices associated with the virtual identity. The SDK can be kept secret from the intermediary repositories in most embodiments. Therefore, the encryption key derived from the pairing code and/or the pairing nonce may encrypt at least the salt value and the SDK, according to these embodiments.

The method may also optionally include sending the identity repository locator to the unregistered device (918). In one embodiment, a virtual identity may be stored on various different identity repositories, and the identity repository locator may be used to select among the available identity repositories. In another embodiment, the identity repository locator is simply a text string that is inserted into an HTTP "Get". In yet another embodiment, the identity repository locator may be provided to the unregistered device as a part of installing a software module from the identity repository or from the pairing repository. In other words, this step in the method may be carried out before the unregistered device makes a registration request.

In order to retrieve the identity repository locator, some embodiments may have the unregistered device send the pairing nonce and/or the pairing code to the pairing repository as an identifier. If the pairing repository determines that the pairing nonce and/or pairing code is a valid and currently active value, the pairing repository may send the identity repository locator in response. In another embodiment, the pairing repository may redirect the request to the identity repository, without explicitly sending the identity repository identifier to the unregistered device. The redirect may also include the pairing code.

FIG. 9B illustrates a flowchart 900*b* of a method for pairing an unregistered device with a virtual identity, according to one embodiment. The method in flowchart 900*b* may be carried out by the identity repository, whereas the method in flowchart 900*a* may have been carried out by the pairing repository. The method may include receiving the pairing code and secret information from the registered device (920) In one embodiment, the secret information is encrypted using the encryption key derived from at least the pairing nonce. Upon receipt, the identity repository may store the secret information in a data structure that is indexed by the pairing code. Additionally, the pairing code and/or the secret information may expire after a predetermined time interval, after which these values may be securely deleted from the identity repository.

The secret information and pairing code may be stored on the identity repository until a request is made from the unregistered device. The method may include receiving the pairing code in a transmission associated with the unregistered device (922) The pairing code may be sent as part of a redirect from the pairing repository as described above. In this case, because the original request originated with the unregistered device, the pairing code may be considered to be in a transmission associated with the unregistered device, even though the pairing code is provided by the pairing repository in the redirect. Alternatively, in cases where the identity repository locator is sent to the unregistered device, the unregistered device may directly transmit the pairing code to the identity repository.

In some embodiments, the additional information may be sent in order to verify the identity of a user. Steps involving such additional information will be described in further detail below. The method may also include associating the unregistered device with the virtual identity using the pairing code (924). In one embodiment, the identity repository may use the pairing code to index a table containing identifying information for the virtual identity, as well as the secret information.

The method may also include sending the secret information to the unregistered device (926). In one embodiment, the secret information may comprise the encrypted SDK and salt values. In another embodiment, additional information may be provided to the unregistered device with the secret information. The additional information may include an Access Master Key (AMK) or a Control Master Key (CMK) depending on whether the unregistered device is a control device or an access device. The AMK/CMK may be encrypted with the SDK. The additional information may also include a user's global ID (GUID), a device ID (DEVID) for the unregistered device, and a sequence value (SEQ). The SEQ may represent a transactional sequence number to be used in future transactions.

After receiving the encrypted secret information, along with any additional information that may be provided by the identity repository, the unregistered device may decrypt the encrypted secret information for use in future transactions Because the unregistered device has access to the pairing code, the pairing nonce, and the KDF, the unregistered device can generate a decryption key for the encrypted secret information. In one embodiment where the unregistered device is a control device, the encryption key may be used to decrypt the SDK, the SDK may be used to decrypt the CMK, and the CMK may be used to derive a Control Device Signature key pair (CDS) that can be used to sign challenges associated with future transactions.

The preceding discussion has focused on a means for sending secret information to an unregistered device without exposing the secret information or the means for encrypting/decrypting the secret information to an intermediary repository. However, according to some embodiments, it may be desirable to also verify that the unregistered device is authorized to receive the secret information using a passcode. Consider the situation where an unauthorized user gains temporary control of a user's access device. The unauthorized user could then authorize a control device belonging to the unauthorized user using the procedure described above, thereby obtaining the secret information. In some embodiments, this threat can be minimized by requiring a predetermined passcode to be entered into the unregistered device and verified by either the registered device or an intermediary repository.

In some embodiments utilizing an intermediary repository, it may also be desirable to prevent the intermediary repository from discovering the passcode. According to one embodiment, a passcode may be "salted" on a registered device, then hashed and sent to the repository for verification. This minimizes the threat of a dictionary attack, and only provides the repository with a salted, hashed version of the passcode for comparison. When registering an unregistered device, the unregistered device cannot simply hash a passcode. This would leave the passcode vulnerable to dictionary attacks. It is also undesirable to transmit the salt in a usable form to the unregistered device for use in passcode verification, until the passcode is verified. The embodiments described herein may be used to solve these and other problems encountered when registering an unregistered device.

As used herein, the term "passcode" may refer to a password, a PIN, a personal identifier, a one-time password, a hardware dongle, and/or the like. According to one embodiment, if the unregistered device is an access device, then the passcode may comprise a password. Similarly, if the unregistered device is a control device, then the passcode may comprise a PIN.

Figure 10:
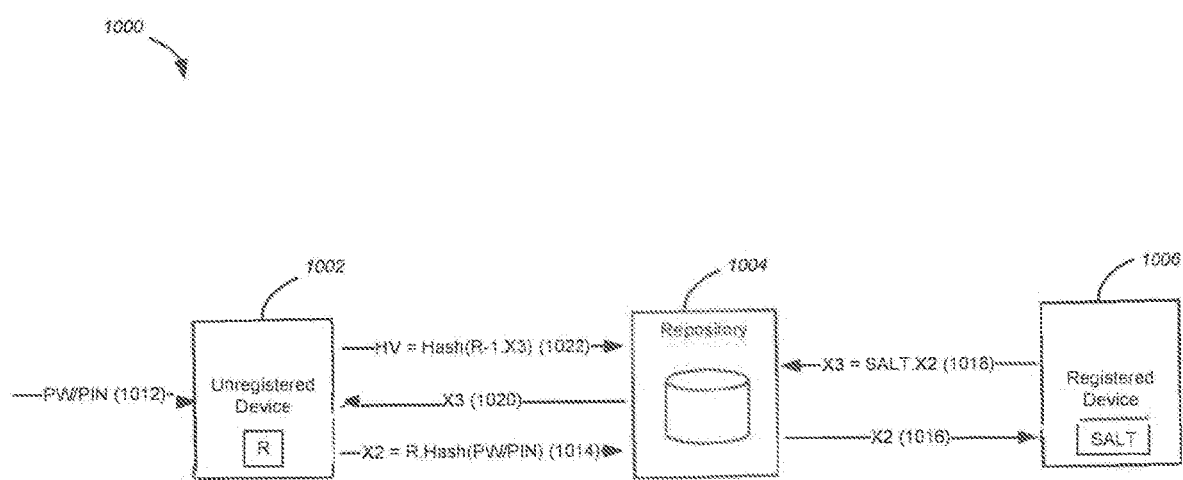
FIG. 10 illustrates a simplified block diagram of a system for registering and verifying a passcode provided by an unregistered device, according to one embodiment.

FIG. 10 illustrates a block diagram 1000 of a system for verifying a passcode, according to one embodiment. In this embodiment, a single intermediary, repository 1004, may be used. Note that in other embodiments, as will be described below, more than one intermediary may be used. Here, an unregistered device 1002 may generate, received, load, or acquire a value "R". The value R may be a random number or a pseudo random number. The unregistered device 1002 may also receive a passcode from a user or software process (1012).

Next, the unregistered device 1002 can create a hash of the passcode. Any known hashing algorithm may be used. In one embodiment, the unregistered device 1002 may use SHA256 or a similar algorithm. In another embodiment, the unregistered device 1002 may use methods related to elliptic curve cryptography. For example, a function such as "HashToCurve(passcode)" may be used to hash the passcode to an elliptic curve. The hashed passcode may be "shifted" along the elliptic curve using a trapdoor function. According to one embodiment, the hashed passcode may be shifted along the elliptic curve using elliptic curve multiplication by the value R. This operation may be denoted by the equation "$X2=R.HashToCurve(passcode)$" the value X2 may be referred to as a blind verifier. Because elliptic curve multiplication is a trapdoor function (i.e., difficult to calculate in the reverse direction without knowledge of the value R) the blind verifier X2 may be sent to the repository 1004 (1014) without revealing the passcode or the value R to the repository 1004.

The repository 1004 may next forward the value to the registered device 1006 (1016). The registered device 1006 may then perform a similar shift of the blind verifier using the salt value. In one embodiment, the registered device 1006 may use elliptical curve multiplication to shift the blind verifier X2 along the elliptical curve using the salt value. The result may we referred to as a salted blind verifier X3, where $X3=SALT.X2$. The registered device 1006 may then send the salted blind verifier X3 to the repository 1004 (1018). Again, because shifting by the salt value is a trapdoor function, the salt value is not exposed to the repository 1004 by transmitting the salted blind verifier X3.

The repository may then forward the salted blind verifier X3 to the unregistered device 1002 (1020). The unregistered device may then calculate an inverse of the value R. The salted blind verifier X3 may then be shifted using the inverse of the value R to obtain the verifier V, where V SALT.HashToCurve(passcode). In one embodiment, the inverse of the value R may be a multiplicative inverse of the value R modulo the order of the curve. Note that in this embodiment, if the order of the curve is given by n, then a point on the curve multiplied by n is equal to the point on the curve (n*X=X). Therefore, $R*R^{-1}$ mod n=1 Note that the verifier V may be the same verifier used by the registered device 1006 when verifying a passcode to the repository. In other words, one effect of these transactions is to provide a hashed, salted passcode from the unregistered device 1002 without making the salt value accessible to the unregistered device before the passcode is verified.

The unregistered device 1002 may then pass the verifier V in some form to the repository 1004. In one embodiment, the unregistered device 1002 can again hash the verifier V and send the hashed verifier HV to the repository 1004 (1022). The repository 1004 can then compare the hashed verifier HV against a stored value. Alternatively, the repository 1004 can hash the hashed verifier HV one or more additional times before comparing it to the stored value. In another embodiment (not shown), the repository 1004 could supply the unregistered device 1002 with a nonce. The unregistered device 1002 could then sign the nonce using the verifier V or a hashed verifier HV, then the signed nonce could be sent back to the repository 1004. The repository 1004 could then verify the signature using the stored value.

Figure 11:
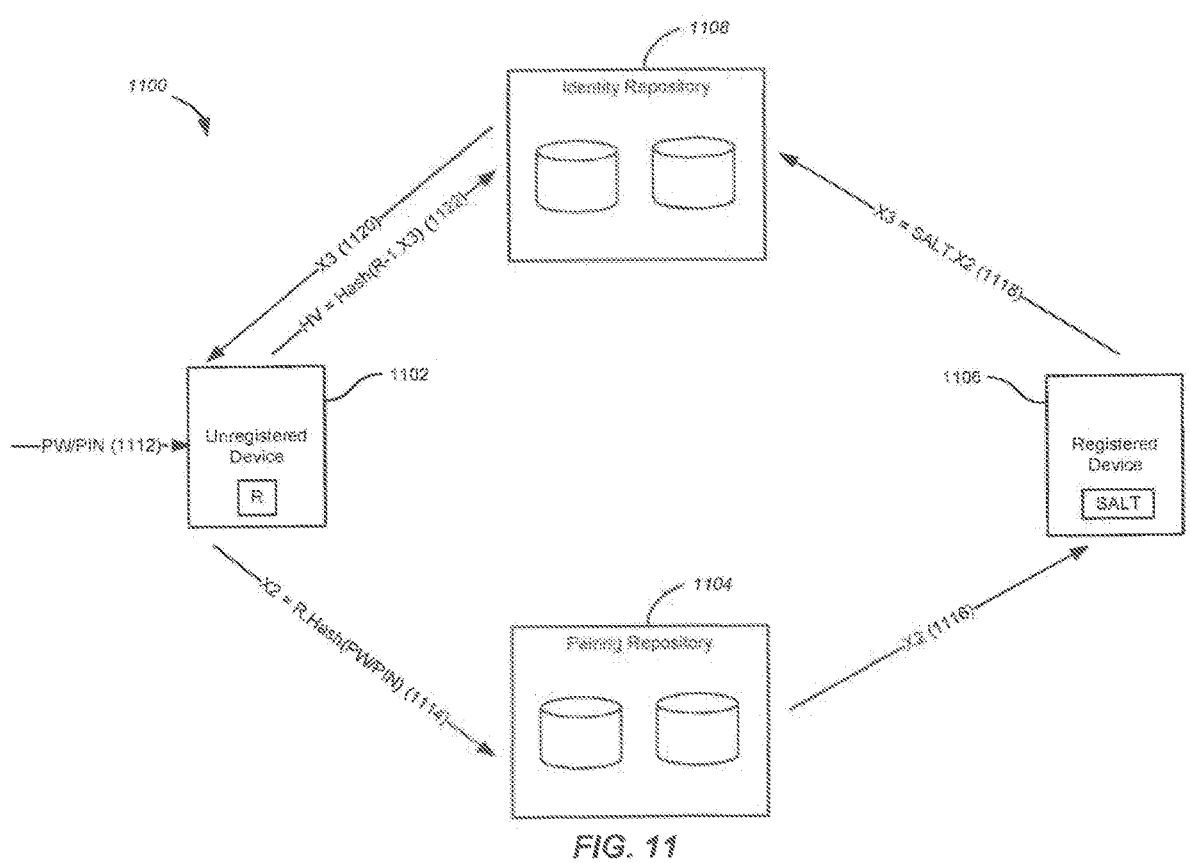
FIG. 11 illustrates a simplified block diagram of an alternate system for registering and verifying a passcode provided by an unregistered device, according to one embodiment.

FIG. 11 illustrates a block diagram 1100 of a system for verifying a passcode, according to one embodiment. In this embodiment, more than one intermediary repository is used. This embodiment may be similar to the embodiment illustrated in FIG. 8, where both an identity repository 1108 and a pairing repository 1104 are used to register an unregistered device 1102. As a part of the registration process, the unregistered device 1102 may use a software module to perform the necessary transactions. In one embodiment, the unregistered device 1102 can use a web browser that navigates to a webpage where JavaScript is made available. In another embodiment, the unregistered device 1102 may download a software application that is run locally. The software module or web browser may prompt the user for a passcode (1112).

The unregistered device 1102 can generate the value R, hash the passcode, and shift the hashed passcode using the value R to generate the blind verifier X2, which can then be sent to the pairing repository 1104 (1114). The pairing repository 1104 can then contact the registered device 1006 and transmit the blind verifier X2 to the registered device 1106 (1116). The registered device 1106 can shift the blind verifier using the salt value to generate a salted blind verifier X3.

In one embodiment, the registered device 1106 may also send an identity repository locator through the pairing repository 1104 to the unregistered device 1102. Registered device 1106 may also send the salted blind verifier X3 to the identity repository 1108 that is referenced by the identity repository locator. In another embodiment, it may not be necessary to send an identity repository locator because, for example, the pairing repository 104 may know the location beforehand, or only a single identity repository may be in use or available.

The unregistered device 1102 may then contact the identity repository 1108. The identity repository 1108 may then send the salted blind verifier X3 to the unregistered device 1102 (1120). The unregistered device 1102 may then compute an inverse of the value R and use it to compute a verifier V. The unregistered device 1102 may then send the verifier V to the identity repository 1108. Alternatively, the unregistered device 1102 may send a hashed verifier HV to the identity repository 1108 or may sign a nonce using either the verifier V or a hashed verifier HV, depending on the embodiment.

Figure 12:
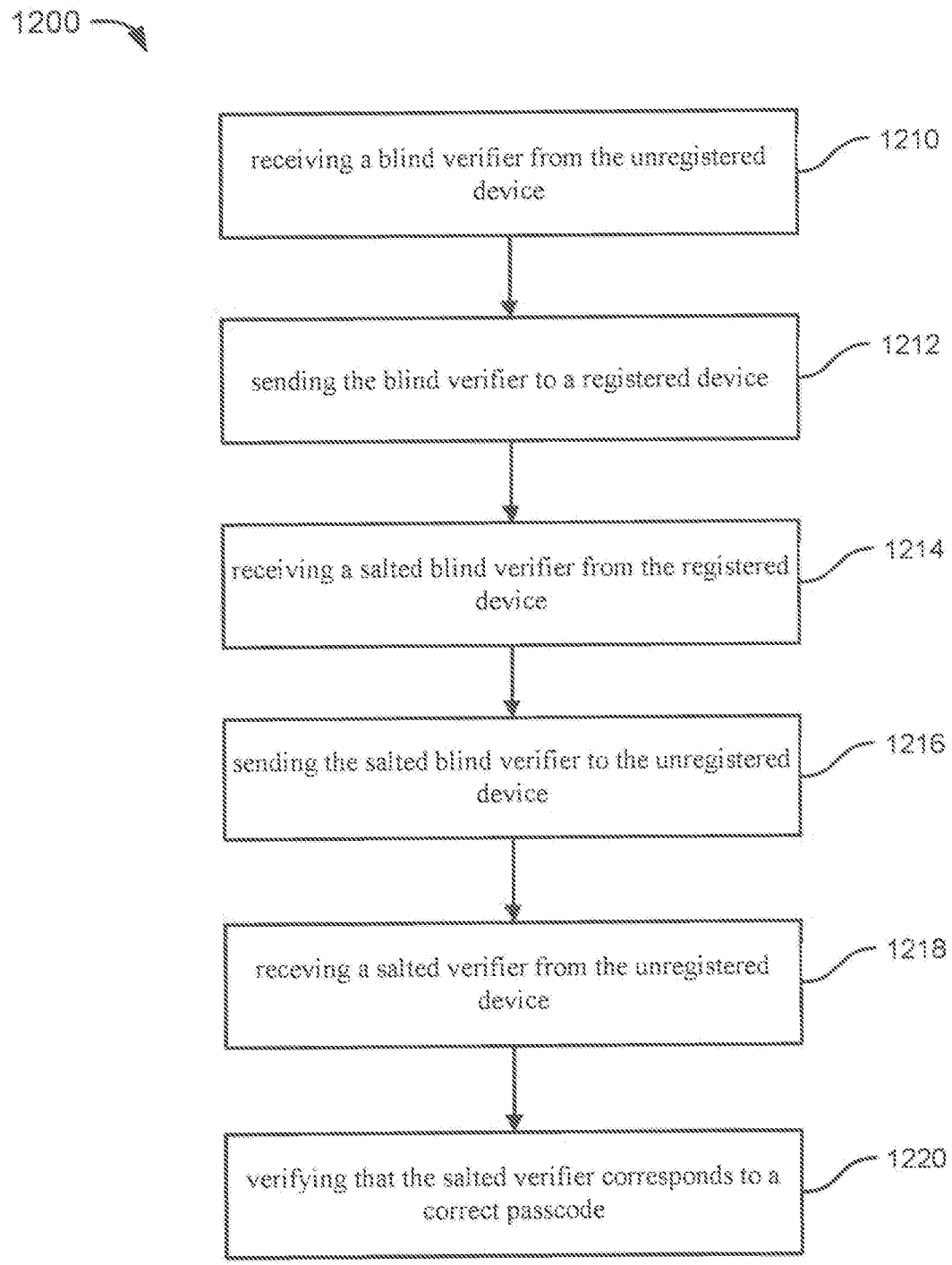
FIG. 12 illustrates a simplified flowchart of a method for registering and verifying a passcode provided by an unregistered device, according to one embodiment.

FIG. 12 illustrates a flowchart 1200 of a method for pairing an unregistered device with a virtual identity where a password is verified, according to one embodiment. The various steps of this method may be executed according to any of the operations described elsewhere in this disclosure. For example, the method may use any of the specific details used to describe FIG. 9 and/or FIG. 10, along with any of the other figures described herein. The method may include receiving a blind verifier from the unregistered device (1210). This step may be performed in accordance with the previous description for computing a blind verifier. In one particular embodiment, the blind verifier may be computed by the unregistered device at least in part by hashing a passcode on an elliptic curve. The blind verifier may also be computed at least in part by shifting the hash of the passcode on the elliptic curve using a value R. In one embodiment, the blind verifier may be received by a repository. In another embodiment, the blind verifier may be received by a pairing repository.

The method may also include sending the blind verifier to a registered device (1212). In one embodiment, the blind verifier may be sent to the registered device in response to receiving a pairing code from the unregistered device. In another embodiment, it may first be ascertained whether either the unregistered device and the registered device have been disabled for pairing operations as will be described further below. In one embodiment the blind verifier may be sent by a repository, while in another embodiment the blind verifier may be sent by a pairing repository.

The method may additionally include receiving a salted blind verifier from the registered device (1214). In one embodiment, the salted blind verifier may be based on the blind verifier in accordance with the previous description for computing a salted blind verifier. In one particular embodiment, the salted blind verifier can be computed by the registered device at least in part by shifting the blind verifier on an elliptic curve using a salt value. The method may further include sending the salted blind verifier to the unregistered device (1216). In one embodiment, the salted blind verifier may be sent and received by an identity repository. In another embodiment, the salted blind verifier may be sent in response to receiving a pairing code from the unregistered device.

The method may also include receiving a salted verifier from the unregistered device (1218). The salted verifier may be computed in accordance with the previous description for computing a salted verifier. In one embodiment, the salted verifier can be computed by the unregistered device at least in part by shifting the salted blind verifier on elliptic curve using an inverse of the value R. The salted verifier may be received by an identity repository. The method may additionally include verifying that the salted verifier corresponds to a correct passcode (1220) In one embodiment, the salted verifier can be hashed one or more times before it is received by an identity repository. In this embodiment, the salted verifier can be verified by comparing it to a salted hashed value of a correct passcode. The salted passcode can be hashed the same number of times as the salted verifier. In another embodiment, the salted verifier can be verified by sending a nonce to the unregistered device. The unregistered device can then sign the nonce using the salted verifier that has been hashed zero or more times. The identity repository can then receive the signed nonce and verify the signature. It will be understood that this method in FIG. 12 may be combined with the data and transmissions previously described in this disclosure.

In order to clarify the order of the transaction flows described in FIGS. 8-12, FIG. 13 illustrates a simplified flow diagram 1300 of communications within a system for pairing devices with a virtual identity, according to one embodiment. Flow diagram 1300 is not meant to be exhaustive, and a number of possible transactions, including some described elsewhere herein, have been left out for brevity. Note that flow diagram 1300 may combine the operations described in relation to FIG. 9A, FIG. 9B, and FIG. 12. In other words, flow diagram 1300 includes operations for encrypting and sending secret information to the unregistered device, as well as verifying a passcode received by the unregistered device. Either or both of these types of operations may be used during a pairing process of an unregistered device.

During the beginning stages of the pairing process, a passcode may be received by the unregistered device (1312). The unregistered device may then compute the X2 value. In one embodiment, the X2 value may be generated by hashing the passcode to an elliptic curve and shifting the hashed passcode according to a randomly generated value R. The X2 value can then be sent to the pairing repository (1314). The pairing repository can then create a pairing code and a pairing nonce that can be sent to the unregistered device (1316) In one embodiment, the pairing repository can store the X2 value in a table that is indexed by the pairing code.

At this point, the unregistered device can provide the pairing code to a user of the unregistered device, for example, by displaying the pairing code on a display screen (1317). The user can then transfer the pairing code to a registered device as part of the pairing process (1318). In one embodiment, the pairing code can be entered into the registered device by the user using a keyboard, touchscreen, mouse, voice input, and/or the like.

After receiving the pairing code, the registered device can send the pairing code to the pairing repository (1320). If the identity repository that will be used to complete the transaction is unknown to the pairing repository, the registered device may also send an identity repository identifier (HREPO) along with the pairing code to the pairing repository Using the pairing code, the pairing repository can look up the X2 value and the pairing nonce that are indexed by the pairing code in a data structure. The pairing repository can then provide the pairing nonce and the X2 value to the registered device (1322). The registered device can then compute the X3 value by shifting the X2 value along the elliptic curve according to a salt value. The registered device can also encrypt secret data, including cryptographic keys and the salt value using the pairing code and/or the pairing nonce in the encryption algorithm. The registered device can then transfer the X3 value, the encrypted secret information, and the pairing code to the identity repository (1324).

Turning back to the unregistered device, the user may provide an input indicating that the pairing code has been entered into the registered device. In response, the unregistered device may send the pairing code to the pairing repository (1325) The pairing repository can then use the pairing code to look up the identity repository identifier so that the unregistered device can contact the identity repository to complete the pairing procedure. In one embodiment, the identity repository identifier can be sent to the unregistered device (1326). The unregistered device can then send the pairing code to the identity repository (1328). In an alternate embodiment (not shown), the pairing repository can receive the pairing code from the unregistered device, and instead of sending the identity repository identifier to the unregistered device, the pairing repository can redirect the request to the identity repository and forward the pairing code to the identity repository. In this case, it need not be apparent to a user of the unregistered device that such a redirection has taken place. Regardless of whether the pairing repository redirects a request from the unregistered device or whether the unregistered device contacts the identity repository directly, the identity repository may be said to receive the pairing code in a transmission associated with the unregistered device.

The identity repository may then use the pairing code to lookup the X3 value associated with the pairing procedure. The X3 value may then be sent to the unregistered device (1330). The unregistered device may then calculate the verifier value V by computing an inverse value of R and shifting the X3 value along the elliptic curve according to the inverse value of R. The verifier value V may then be hashed zero or more times (and may be denoted as HV in some embodiments) and sent to the identity repository (1332). The identity repository may then verify the value of the verifier value V, or a hash thereof, and authorize the pairing transaction. As described above, the verifier value V can be verified by comparing it to a stored value, or hashed stored value, or by having the unregistered device sign a digital challenge using V or HV and verifying the digital signature.

Once the pairing transaction is authorized, the identity repository can store the DEVID of the unregistered device. The identity repository can also send the encrypted secret information to the unregistered device (1334). The unregistered device can then decrypt the secret information using a decryption key based on the pairing nonce and/or the pairing code. The decrypted secret information may include a salt value to be used for future password verifications, as well as one or more cryptographic keys that may be used to derive other encryption keys specific to future transactions with specific relying parties.

Figure 13:
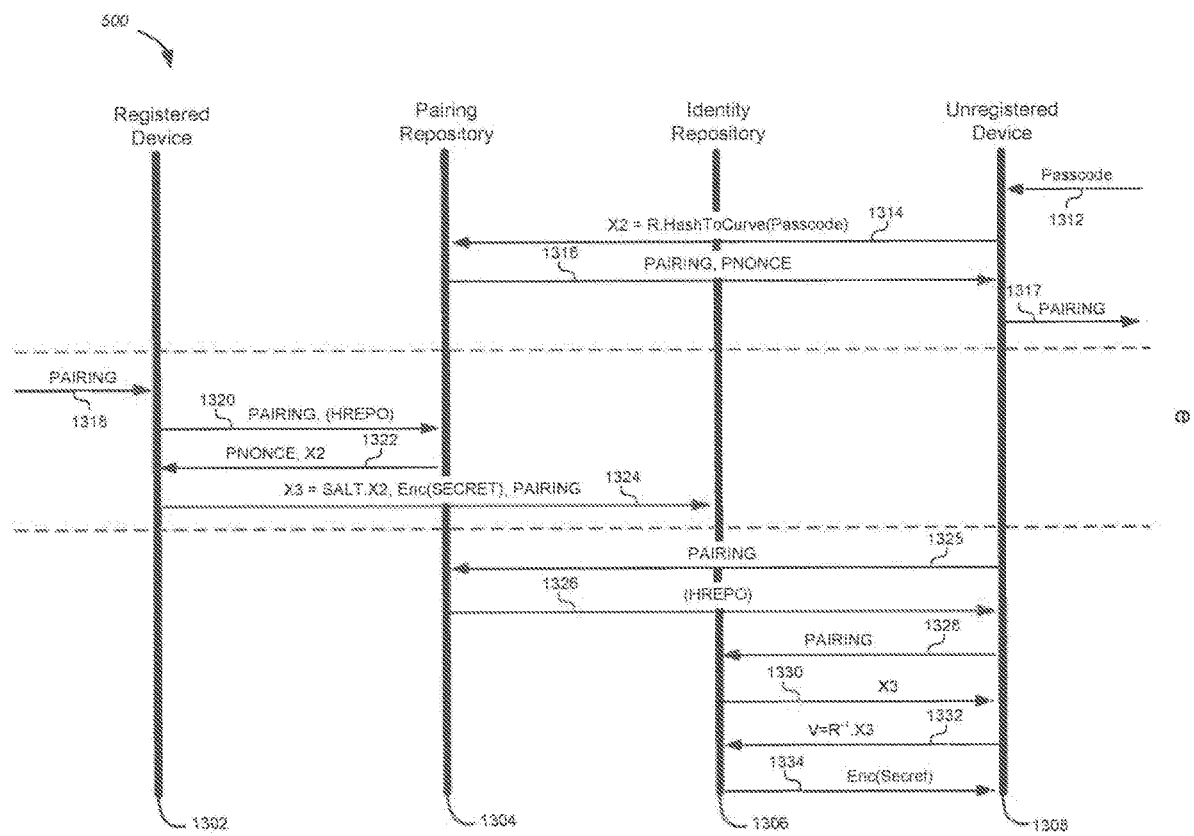
FIG. 13 illustrates a simplified flow diagram of communications within a system for pairing devices, according to one embodiment.

It should be appreciated that the specific steps illustrated in FIGS. 12-13 provide particular methods of pairing devices with a virtual identity according to various embodiments of the present invention. Other sequences of steps may also be performed according to alternative embodiments. For example, alternative embodiments of the present invention may perform the steps outlined above in a different order. Moreover, the individual steps illustrated in FIGS. 12-13 may include multiple sub-steps that may be performed in various sequences as appropriate to the individual step. Furthermore, additional steps may be added or removed depending on the particular applications. One of ordinary skill in the art would recognize many variations, modifications, and alternatives.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

Device Disablement

Some embodiments of the present invention relate to technologies to facilitate disabling devices that are associated with an existing virtual identity. Technologies related to embodiments of the present invention provide a method and system for disabling devices after a number of incorrect passcode guesses related to attempts to use the virtual identity. Also provided are methods and systems for disabling a registered device's ability to approve the pairing of unregistered devices after a number of incorrect passcode guesses.

Consistent with the remainder of this disclosure, a virtual identity may be managed and used by a number of different devices. According to one embodiment, the virtual identity may be managed by an identity repository. The identity repository may include one or more servers operating at a location that is geographically remote from most users. In one embodiment, the identity repository may store information associated with the virtual identity of each user in an encrypted format, such that if the identity repository is compromised, the personal information of each user remain secure Therefore, the means by which the personal information can be decrypted, such as a decryption key, can be stored in a separate location away from the identity repository.

In one embodiment, the identity repository may be authorized to communicate with one or more user devices that are registered with a particular virtual identity. By way of example, the identity repository may be associated with a number of access devices and or a number of control devices associated with each virtual identity. In order to use the virtual identity in a transaction, a user may provide identifiers and/or credentials to the identity repository in order to gain the signature of the identity repository or to retrieve any of the personal data in its encrypted format. For example, the identity repository may sign digital challenges provided by relying parties, such as websites participating in the transaction.

As part of this process, the identity repository may need to identify a device being used in the transaction. For example, a user may log onto a retail website using a desktop computer. In this case, the desktop computer could be considered an access device. The retail website may provide a challenge to be signed by the access device and by the identity repository. When the access device passes the challenge to the identity repository for it a signature, the access device can also provide a user identifier and/or a device identifier. The identity repository can then use the identifier(s) to access a particular virtual identity stored at the identity repository. If the identity repository is unable to identify the access device using the provided device identifier, then the identity repository may refuse to provide a signature.

In addition to verifying the device identifier for any or all devices used in a transaction, it may be advantageous in certain embodiments to verify that the device itself is authorized for use with the virtual identity. Accordingly, a passcode may be accepted from a user device and verified by the identity repository in order to determine that the user device is authorized. However, any scheme using a passcode may eventually be susceptible to a number of different types of attacks, including dictionary attacks, trial and error, etc. Therefore, some of the embodiments discussed herein provide a means for disabling devices after a number of incorrect passcode guesses.

It may be useful to distinguish disabling a device from disabling the virtual identity itself. If the virtual identity is disabled after a certain number of incorrect passcode guesses, then the user may be unable to use the virtual identity. Using the architecture and scheme for managing a virtual identity described above, a possible scenario includes a user losing control of a user device, possibly through theft. An attacker could gain control of the user device and attempt to either (1) use the virtual identity, or (2) pair additional devices with the user identity. After detecting incorrect passcode guesses entered by the attacker, the identity repository could disable the virtual identity. However, doing so would prevent a legitimate user from using the virtual identity on devices remaining within his/her control. In contrast, embodiments described herein may provide a method for disabling only the stolen device from performing certain actions, such as signing digital challenges, pairing additional devices, and so forth. This may provide the advantage of allowing continued legitimate use of the virtual identity after the theft or misappropriation of a user device.

Figure 14:
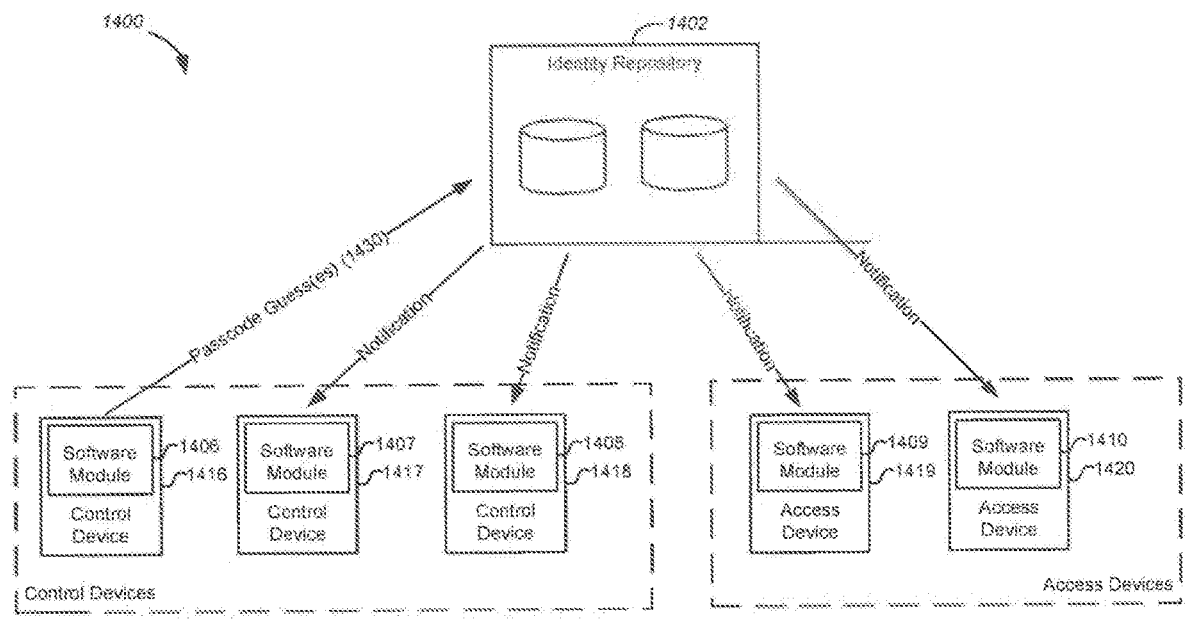
FIG. 14 illustrates a simplified block diagram of a system for device disablement, according to one embodiment.

FIG. 14 illustrates a simplified block diagram 1400 of a system for device disablement, according to one embodiment. An identity repository 1402 may be provided to store encrypted information associated with the virtual identity and to manage various user devices associated with the virtual identity. As described above, one or more computing devices may be used with the user identity. In one embodiment, user devices may be divided into at least two categories-access devices, and control devices. Access devices may be primary devices from which transactions involving the virtual identity are initiated. Control devices may be secondary devices that may be used to provide an out-of-band (OOB) authorization for transactions requiring such. In some embodiments, both control devices and access devices may be used to interact with the identity repository 1402 and to pair unregistered devices with the virtual identity.

Each user device may use software modules that may be associated with the identity repository 1402. For example, access device 1419 may include software module 1409 operating thereon. Software module 1409 may comprise a web browser, JavaScript, a webpage, a dedicated application, a background process, and/or the like. Similarly, control device 1418 may include software module 1408 operating thereon. If control device 1418 comprises a smart phone, software module 1408 may comprise an a mobile application ("app") made available by the identity repository 1402 or by an entity associated with the identity repository 1402.

Generally, each user device may both send and receive information to the identity repository 1402. In one exemplary transaction, the identity repository 1402 may send a message to control device 1416 requesting that a passcode be entered. This request may be part of a transaction initiated by an access device, such as access device 1420. This request may also be part of an interaction with the identity repository 1402 involving only control device 1416. For example, control device 1416 may have previously sent a request to the identity repository 1402 to manage, extract, view, decrypt, transmit, manipulate, or otherwise interact with information related to the virtual identity. Either of these transactions, along with other similar types of transactions, may prompt the identity repository 1402 to request a passcode guess from control device 1416, according to system preferences, relying party preferences, device preferences, and/or user preferences.

In response, software module 1406 may prompt the user to enter a passcode guess. The passcode guess may then be transmitted to the identity repository 1402 (1430). Using methods and systems described in the previous section, the passcode guess need not be transmitted in an unaltered form. It may be advantageous to perform certain operations on the passcode guess that make it difficult for an attacker to decipher the passcode guess after it is entered. For example, the passcode guess may first be combined with a salt value and/or hashed using various known algorithms, such as elliptic curve cryptography algorithms, before it is sent to the identity repository 1402. This may lessen the likelihood of success of a dictionary attack and may also prevent the identity repository 1402 from storing anything other than a salted/hashed verifier value that cannot easily be used to determine the passcode.

If the identity repository 1402 determines that the passcode guess is correct, the transaction involving control device 1416 may be authorized. On the other hand, if the identity repository 1402 determines that the passcode guess is incorrect, the identity repository 1402 may take appropriate action. In one embodiment, if the number of passcode guesses meets or exceeds a threshold value, the identity repository 1402 may disable control device 1416 such that control device 1416 cannot be used in certain types of transactions in the future. Additionally, the identity repository 1402 may send notifications to remaining user devices that have not been compromised. For example, identity repository 1402 may send notifications to software modules 1407 and 1408 operating on control devices 1417 and 1418 respectively. Also, the identity repository 1402 may send notifications to software modules 1409 and 1410 operating on access devices 1419 and 1420 respectively. These notifications will be discussed in greater detail below.

Figure 15:
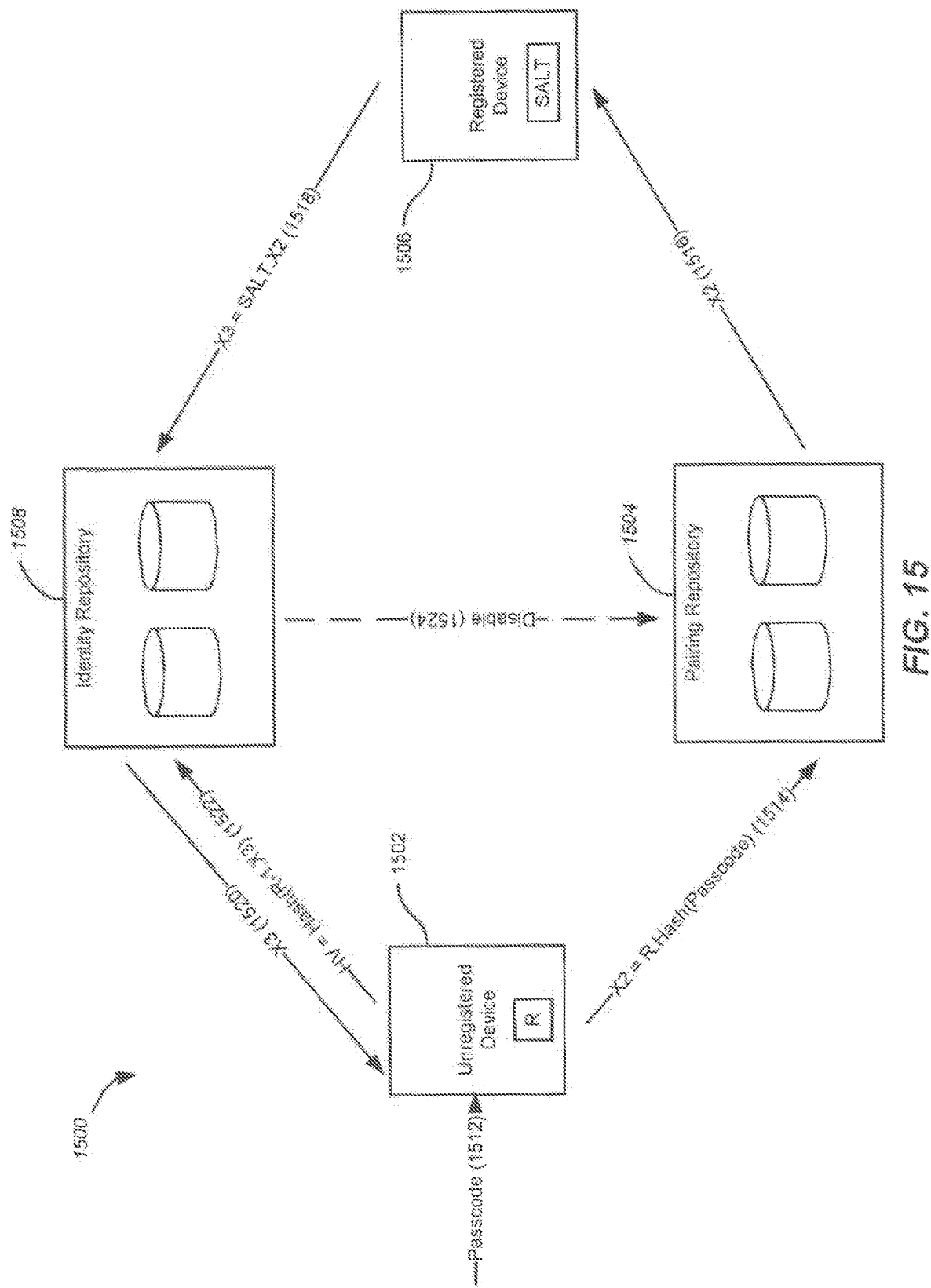
FIG. 15 illustrates a simplified block diagram of a system for device disablement when pairing unregistered devices, according to one embodiment.

FIG. 15 illustrates a simplified block diagram 1500 of a system for device disablement when pairing unregistered devices, according to one embodiment. In this embodiment, the passcode guess may be associated with an operation for pairing an unregistered device 1502 using a registered device 1506. This particular embodiment may be similar to the embodiment described in relation to FIG. 11. However, it will be understood that the transactions illustrated in FIG. 15 are merely exemplary, and that many different types of transactions may be used to pair devices.

According to this embodiment, the unregistered device 1502 may receive a passcode from a user (1512). The unregistered device 1502 may perform operations intended to conceal the value of the passcode, such as hashing the passcode and/or shifting the hashed value along and elliptic curve by a value R to form a blind verifier. The blind verifier may then be sent to a pairing repository 1504 (1514), and then forwarded to the registered device 1506 (1516). The registered device 1506 may then shift the blind verifier by a salt value to form a salted blind verifier, which may then be sent to the identity repository 1508 (1518), and then forwarded on to the unregistered device 1502 (1520). The unregistered device may then compute the hashed verifier by shifting by the inverse value of R, and send the hashed verifier back to the identity repository 1508 (1522) The identity repository 1508 may then determine whether the passcode entered by the user is correct by comparing the hashed verifier to a stored value. Other transactions and data may also be involved in this procedure that are not explicitly shown in FIG. 15.

In this embodiment, the identity repository 1508 may determine that the passcode is correct, in which case the unregistered device 1502 may be provided with secret data and/or paired with the virtual identity. On the other hand, the identity repository 1508 may determine that the passcode is incorrect, in which case the identity repository 1508 may take action. In one embodiment, the identity repository 1508 may refuse to pair any additional unregistered devices using registered device 1506. In another embodiment, the identity repository 1508 may prevent the unregistered device 1502 from being registered using any registered device. In another embodiment, the identity repository 1508 may send an indication to the pairing repository (1524). Such an indication may be used to prevent the pairing repository 1504 from registering the unregistered device 1502 during future attempts, or may be used to prevent the pairing repository 1504 from pairing any unregistered device using registered device 1506, depending on the embodiment.

Figure 16:
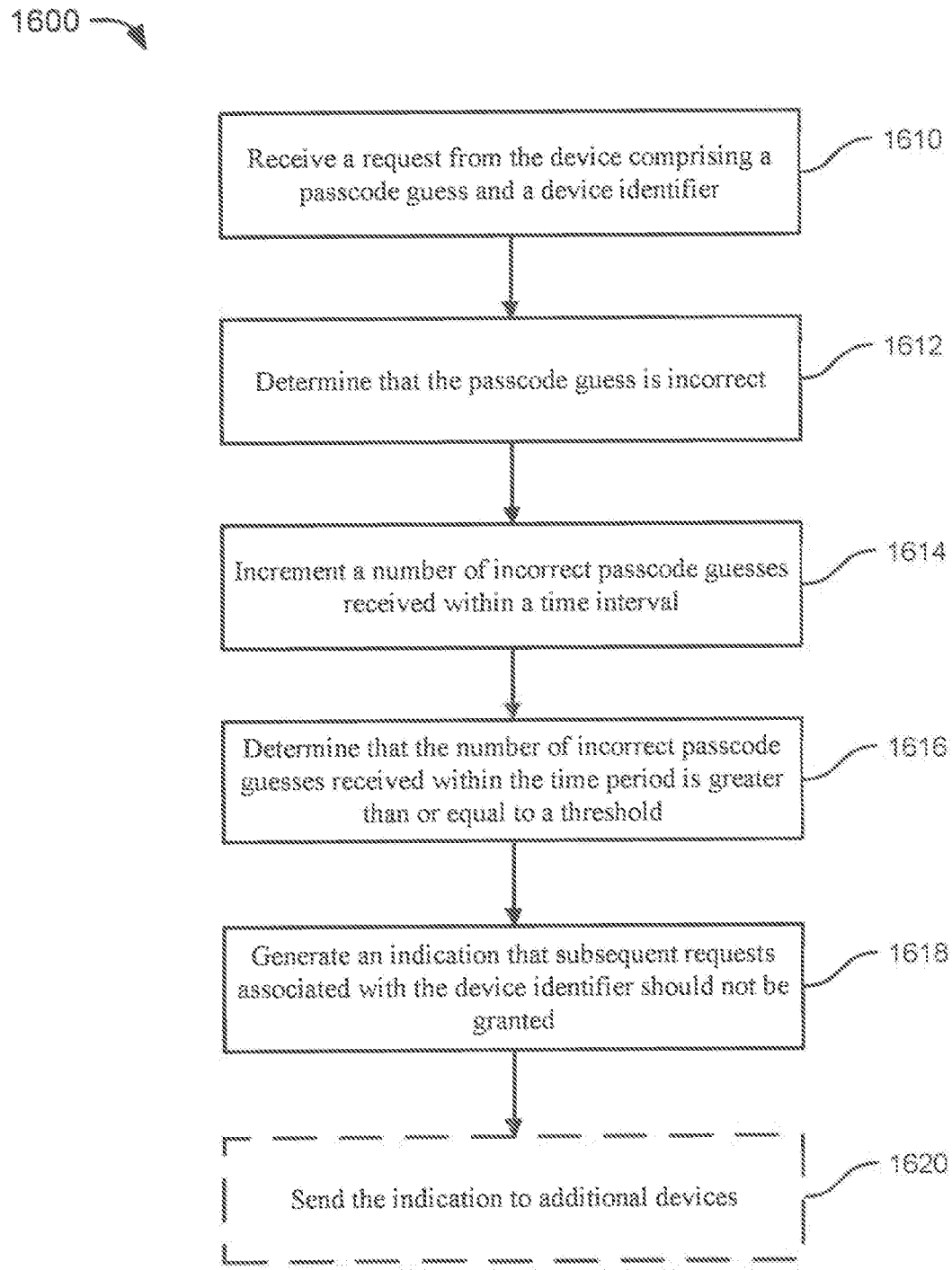
FIG. 16 illustrates a flowchart of a method for disabling devices associated with a virtual identity, according to one embodiment.

FIG. 16 illustrates a flowchart 1600 of a method for disabling devices associated with a virtual identity, according to one embodiment. The method may include receiving a request from a device (1610). The device may comprise an access device or a control device. The device may comprise any computing device, including a laptop computer, a desktop computer, a thin client, a tablet computer, a server, a smart phone, a PDA, and/or the like. In one embodiment, the request may be received by a repository. The repository may comprise an identity repository, a pairing repository, or another similar repository. The repository may be located geographically away from the device. In one embodiment, the repository may store encrypted information associated with the virtual identity and may provide authentication procedures for transactions involving the virtual identity.

In one embodiment, the request may comprise a passcode guess. The passcode guess may comprise a PIN. The passcode guess may also comprise a password. In one embodiment, the passcode guess may comprise a digital certificate provided by software module or a hardware dongle. The passcode guess may also comprise any combination of alphanumeric characters. In another embodiment, the passcode guess may comprise a biometric identification, such as a retinal scan, a fingerprint, a voice verification, a DNA verification, and/or the like. The passcode guess may be provided by a user of the device, who may be authorized or unauthorized. The user may be an owner or an attacker. In another embodiment, the passcode guess may be provided by a hardware or software module.

In one embodiment, the passcode guess may be cryptographically transformed in order to obscure its value. For example, the passcode guess may be salted with a value. The passcode guess may also be hashed according to known hash algorithms, such as SHA256 and elliptic curve hashing algorithms. The passcode guess may also be shifted on an elliptic curve after it is hashed by one or more values. It will be understood that the passcode guess that is received in this step may be altered in many different ways to conceal its value.

In one embodiment, the request may further comprise a device identifier. The device identifier (DEVID) may correspond to a value stored at the repository to identify a previously registered device. The device identifier may also correspond to a value entered by a user during the current transaction. For example, during a pairing transaction, the user or unregistered device may provide a device identifier that may be used to identify the unregistered device in future transactions if the pairing procedure is successful. The device identifier may be unique to the device and may be checked against existing device identifiers to avoid collisions.

The method may also include determining whether the passcode guess is incorrect (1612). In one embodiment, the passcode may be compared to a value previously stored at the repository. In embodiments where the passcode has been hashed using a trapdoor function, the resulting value may be compared to a previously stored hash value at the repository. In another embodiment, a value may be received from another device and compared to the passcode guess. In other embodiments, additional operations may also be performed on the passcode guess, a cryptographically altered version of the passcode guess, a stored value, and/or a hashed stored value in order to determine whether the passcode guess is correct.

The method may additionally include incrementing a number of incorrect passcode guesses received within a time interval (1614). In one embodiment, this step may be implemented by storing a value in one or more memories at the repository. This value may be associated with the virtual identity and may be changed during any transaction in which a passcode is received. In one embodiment, the number of incorrect passcode guesses may be incremented by a value of 1 each time a passcode guess is incorrect. In another embodiment, the number of incorrect passcode guesses may be incremented by values of 2, 3, 4, etc based on the type of transaction. For example, a first incorrect passcode guess may incremented by 1, while a second incorrect passcode guess during the same transaction may increment by a value of 2. In another example, incorrect passcode guesses during low value transactions may incremented by value of 1, while incorrect passcode guesses during high-value transactions may incremented by higher values. In yet another example, incorrect passcode guesses from portable devices may incremented by high value, such as 3, while incorrect passcode guesses from stationary or less portable devices may incremented by a lower value. Increment values may also be based on whether a device is a control device or an access device, the time of the transaction, whether encrypted information is requested by the transaction, the identity of a relying party, the age of the virtual identity account, the strength of the passcode, and/or the like. Increment values may also be based on user preferences, device preferences, repository preferences, and/or relying party preferences.

In another embodiment, if it is determined that the passcode guess is correct, the number of incorrect passcode guesses may be decremented by a value. For example, a correct passcode guess may decrement the number of incorrect passcode guesses by 1. A correct passcode guess during a high-value transaction may decrement the number of incorrect passcode guesses by a value of 2 or 3. Additionally, a correct passcode guess may reset the number of incorrect passcode guesses to an initial value, such as 0. The number of incorrect passcode guesses may also be reset or otherwise changed by an authenticated user or user device.

In one embodiment, the time interval may be a periodic time interval, such as a day or a week. In other words, the repository can store a number of incorrect passcode guesses for the current day or the current week. At the end of the periodic time interval, the number of incorrect passcode guesses may be reset or otherwise decreased. In another embodiment, the time interval may be a sliding time window. In this embodiment, the repository can store a number of incorrect passcode guesses that have occurred within one day or one week from the current time. Incorrect passcode guesses that pass outside of the time window may have their values removed from the number of incorrect passcode guesses. In another embodiment, the time interval may be established based on the type of transaction. For example, for high-value transactions the time interval may be longer than it would be for low value transactions. Also, a separate value may be stored for the number of incorrect passcode guesses related to each type of transaction. For example, one value may be stored for control device transactions, while a separate value may be stored for low value transactions. The time window may be based on any transaction characteristic such as value, time, device, user, repository location, device location, and/or the like. In some embodiments, the time interval may be infinite or may be the lifetime of the associated virtual identity.

The method may further include determining that the number of incorrect passcode guesses received within the time interval is greater than or equal to a threshold (1616). In one embodiment, the threshold may be a static value that is uniform for each transaction. In another embodiment, each user device may have its own threshold based on the type of device, the device security, the device location, and/or the like. In another embodiment, the threshold value may be adjusted dynamically based on characteristics of the transaction such as those enumerated above. A threshold that changes dynamically may be combined with the dynamically changing increment values discussed above to create a fully customizable security setting for each situation. These settings may be specified by the user, the repository, the device, and/or the relying party, and they may be stored at any device involved in the transaction.

In some embodiments, the number of incorrect passcode guesses can be directly compared with a threshold to determine whether the number of incorrect passcode guesses is greater than or equal to the threshold. In other embodiments "greater than or equal" may be evaluated as a relative expression. In other words, this may cover situations where a threshold is violated that uses metrics other than numerical values to track and evaluate incorrect passcode guesses.

The method may also include generating an indication that subsequent requests associated with the device identifier should not be granted (1618). Generating this indication may also include storing this indication in one or more memories located at the repository or elsewhere. In one embodiment, the subsequent requests may comprise pairing operations. In this embodiment, either the unregistered device or the registered device may be implicated Either of these devices may be restricted from other operations in addition to pairing operations. In another embodiment, the subsequent requests may comprise requests to use the virtual identity. In yet another embodiment, the subsequent requests may comprise requests to approve a transaction, to store personal information, to change preferences, to authenticate a user, and/or the like. Any or all of these transaction types may be restricted, based on the particular embodiment.

In one embodiment, a transaction type may be restricted by preventing future requests from being approved. For example, during a pairing operation, a restricted unregistered device may send request to a pairing repository. Instead of accepting the request and forwarding it to a registered device, the pairing repository may simply block or suspend the request. In some cases, the pairing repository may send a response to the unregistered device that the pairing operation has failed or has been canceled. In other cases, the pairing repository need not send a response to the unregistered device such that the attacker need not be alerted that possible fraud has been detected. Some embodiments may even send an indication that the transaction/pairing was successful in hopes that the attacker will provide more information that can be used to locate the compromised device. These same operations can be applied to the registered device in a pairing transaction.

In one embodiment, additional devices may also be restricted in addition to the device from which the incorrect passcode guesses originated. For example, a user preference may stipulate that when the threshold number of incorrect passcode guesses is met or exceeded, all control devices may be restricted. In another embodiment, certain types of transactions may be restricted, such as high-value transactions, nighttime transactions, transactions outside of a home geographic area, and/or the like. In another embodiment, the restriction may be time-limited for any and all of these devices and/or transaction types. For example, other control devices may be restricted for an interval of, for example, 6 hours, after which the restriction may be lifted. This embodiment may provide an opportunity for a user to take action without restricting uncompromised devices longer than necessary.

The method may optionally include sending the indication to additional devices (1620). In one embodiment, where a pairing operation is taking place, passcode verification may take place at an identity repository. If the threshold is met or exceeded, the identity repository may send the indication to the pairing repository. In this case, the pairing repository can then detect and stop future pairing attempts with the identified device.

Additionally, the indication may be sent to one or more user devices. In one embodiment, the repository may send the indication to one or more of the user's control devices. For example, the repository may send the indication as a push notification to a user's smart phone. The indication may also be sent to a user's access devices. Note that in this embodiment, only the device from which the incorrect passcode guesses were received is restricted, all of the users other devices are still able to fully utilize the virtual identity. For example, the indication sent to a user's access device may include details about the transactions during which incorrect passcode guesses were received. This may include a vendor, a relying party, a location, a device ID, any information provided by the user of the compromised device, a transaction value, shipping address, and/or the like. The indication sent to the access device may also include options for reporting the transaction and/or minimizing possible damages, such as restricting additional user devices, restricting certain transaction types, or tracking additional attempts by the compromised device.

It should be appreciated that the specific steps illustrated in FIG. 16 provide particular methods of disabling devices according to various embodiments of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
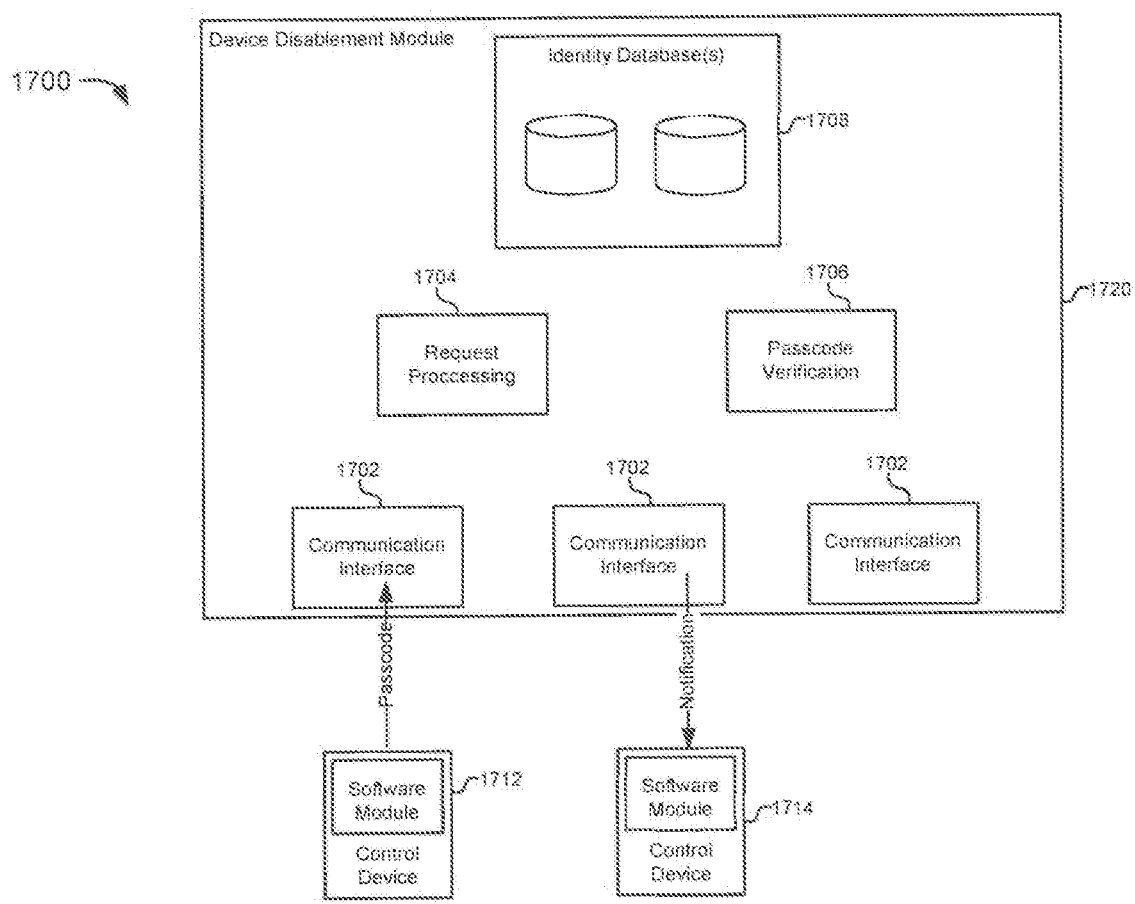
FIG. 17 illustrates a simplified block diagram of a system for device disablement, according to one embodiment.

FIG. 17 illustrates a simplified block diagram 1700 of a system for device disablement, according to one embodiment. The system for device disablement 1720 may be implemented using hardware modules, software modules, or a combination of hardware and software. In some cases, each of the sub-modules depicted in FIG. 17 may be implemented using solely analog or digital hardware such as is disclosed later herein.

The system for device disablement 1720 may include identity database(s) 1708 that store and manage encrypted information associated with virtual identities. The system for device disablement 1720 may also include one or more communication interfaces 1702 that are configured to send and receive transmissions to and from user devices. For example, the one or more communication interfaces 1702 may receive wireless transmissions, network transmissions, Internet-based transmissions, and/or the like from control devices 1712 and 1714, along with other user devices not explicitly illustrated.

The system for device disablement 1720 may also include a request processing module 1704. The request processing module 1704 may include one or more processors, such as microprocessors, microcontrollers, digital logic, and/or the like. The request processing module 1704 may be configured to receive and process requests, such as requests including a passcode. The system for device disablement 1720 may further include a passcode verification module 1706. The request processing module 1704 may share at least a portion of a received request with the passcode verification module 1706. The password verification module 1706 may be configured to determine whether a passcode is correct. The password verification module 1706 may then make the results of this determination available to the request processing module 1704, which may then use the one or more communication interfaces 1702 to send a response.

In one embodiment, the various modules and systems in FIG. 17 may be implemented in software and may reside on separate computer systems. Alternatively, multiple modules may be combined on the same or similar computer systems. In addition, whether in hardware or software, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

Exemplary Hardware

Figure 18:
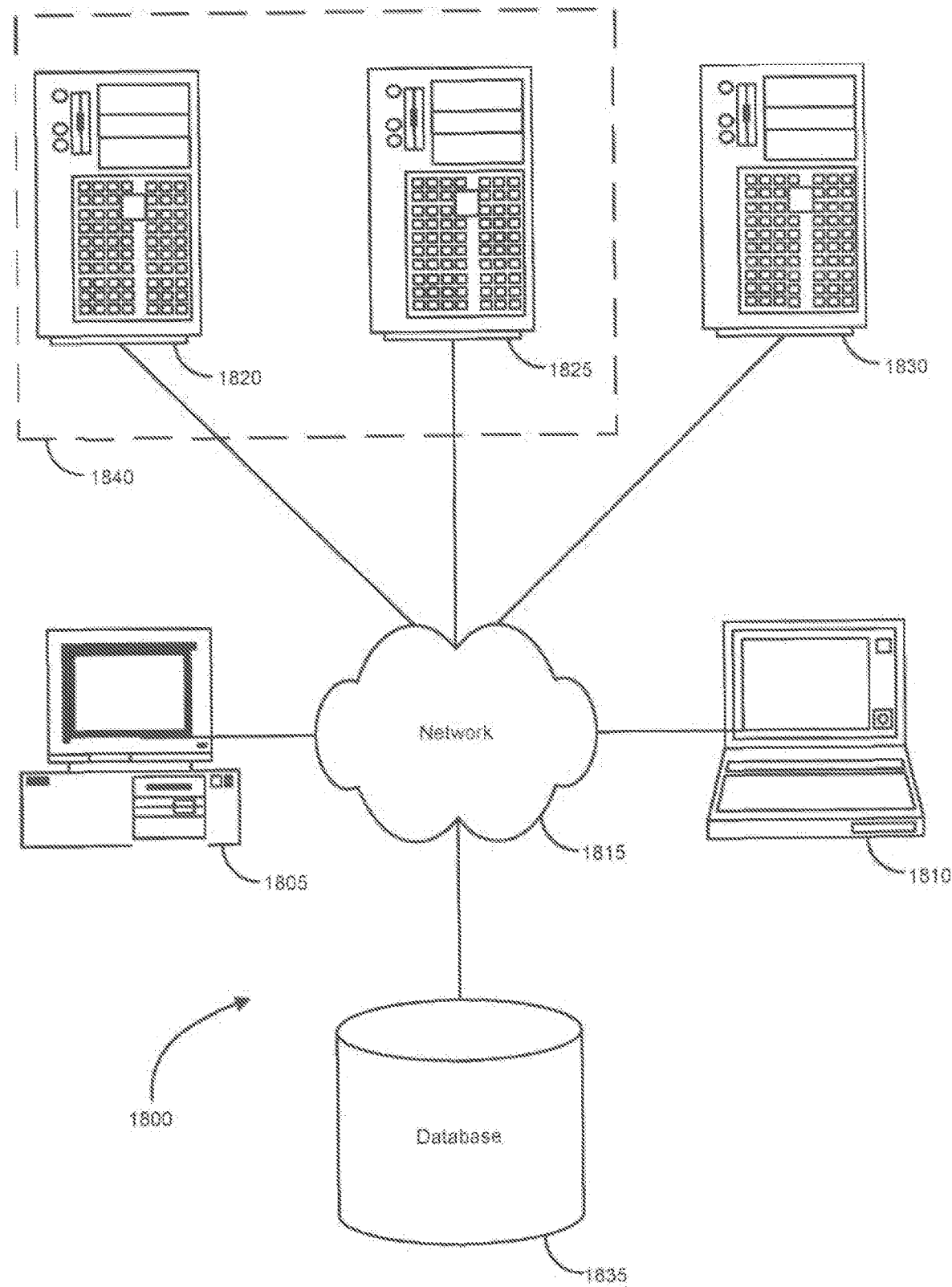
FIG. 18 illustrates a simplified block diagram illustrating components of an exemplary operating environment in which various embodiments of the present invention may be implemented.

Each of the embodiments disclosed herein may be implemented in one or more computer systems. FIG. 18 is a block diagram illustrating components of an exemplary operating environment in which various embodiments of the present invention may be implemented. The system 1800 can include one or more user computers 1805, 1810, which may be used to operate a client, whether a dedicated application, web browser, etc. The user computers 1805, 1810 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems) These user computers 1805, 1810 may also have any of a variety of applications, including one or more development systems, database client and/or server applications, and web browser applications. Alternatively, the user computers 1805, 1810 may be any other electronic device, such as a thin-client computer, Internet-enabled mobile telephone, and/or personal digital assistant, capable of communicating via a network (e.g., the network 1815 described below) and/or displaying and navigating web pages or other types of electronic documents. Although the exemplary system 1800 is shown with two user computers, any number of user computers may be supported.

In some embodiments, the system 1800 may also include a network 1815. The network may be any type of network familiar to those skilled in the art that can support data communications using any of a variety of commercially-available protocols, including without limitation TCP/IP, SNA, IPX, AppleTalk, and the like. Merely by way of example, the network 1815 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 1820, 1825, 1830 which can be general purpose computers and/or specialized server computers (including, merely by way of example, PC servers, UNIX servers, mid-range servers, mainframe computers rack-mounted servers, etc.). One or more of the servers (e.g., 1830) may be dedicated to running applications, such as a business application, a web server, application server, etc. Such servers may be used to process requests from user computers 1805, 1810. The applications can also include any number of applications for controlling access to resources of the servers 1820, 1825, 1830.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1805, 1810. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft, Sybase®, IBM® and the like, which can process requests from database clients running on a user computer 1805, 1810.

In some embodiments, an application server may create web pages dynamically for displaying on an end-user (client) system. The web pages created by the web application server may be forwarded to a user computer 1805 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1800 may also include one or more databases 1835. The database(s) 1835 may reside in a variety of locations. By way of example, a database 1835 may reside on a storage medium local to (and/or resident in) one or more of the computers 1805, 1810, 1815, 1825, 1830. Alternatively, it may be remote from any or all of the computers 1805, 1810, 1815, 1825, 1830, and/or in communication (e.g., via the network 1820) with one or more of these. In a particular set of embodiments, the database 1835 may reside in a storage-area network ("SAN") familiar to those skilled in the art. Similarly, any necessary files for performing the functions attributed to the computers 1805, 1810, 1815, 1825, 1830 may be stored locally on the respective computer and/or remotely, as appropriate. In one set of embodiments, the database 1835 may be a relational database, such as Oracle 10g, that is adapted to store, update, and retrieve data in response to SQL-formatted commands.

Figure 19:
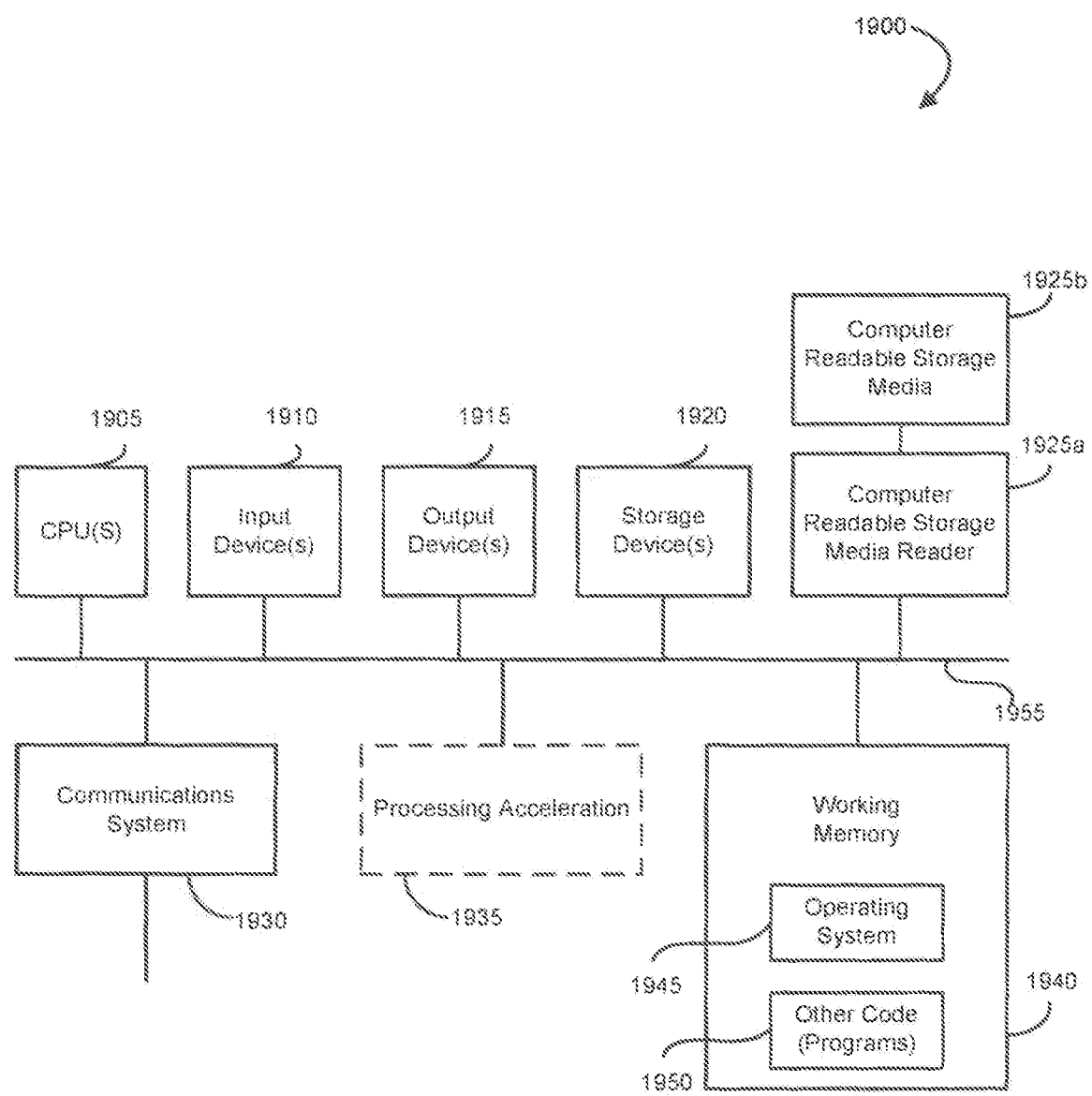
FIG. 19 illustrates a simplified block diagram illustrating an exemplary computer system in which embodiments of the present invention may be implemented.

FIG. 19 illustrates an exemplary computer system 1900, in which various embodiments of the present invention may be implemented. The system 1900 may be used to implement any of the computer systems described above. The computer system 1900 is shown comprising hardware elements that may be electrically coupled via a bus 1955. The hardware elements may include one or more central processing units (CPUs) 1905, one or more input devices 1910 (e.g., a mouse, a keyboard, etc.), and one or more output devices 1915 (e.g., a display device, a printer, etc.). The computer system 1900 may also include one or more storage device 1920. By way of example, storage device(s) 1920 may be disk drives, optical storage devices, solid-state storage device such as a random access memory ("RAM") and/or a read-only memory ("ROM"), which can be programmable, flash-updateable and/or the like.

The computer system 1900 may additionally include a computer-readable storage media reader 1925*a*, a communications system 1930 (e.g., a modem, a network card (wireless or wired), an infra-red communication device, etc.), and working memory 1940, which may include RAM and ROM devices as described above. In some embodiments, the computer system 1900 may also include a processing acceleration unit 1935, which can include a DSP, a special-purpose processor and/or the like.

The computer-readable storage media reader 1925*a* can further be connected to a computer-readable storage medium 1925*b*, together (and, optionally, in combination with storage device(s) 1920) comprehensively representing remote, local, fixed, and/or removable storage devices plus storage media for temporarily and/or more permanently containing computer-readable information. The communications system 1930 may permit data to be exchanged with the network 1920 and/or any other computer described above with respect to the system 1900.

The computer system 1900 may also comprise software elements, shown as being currently located within a working memory 1940, including an operating system 1945 and/or other code 1950, such as an application program (which may be a client application, web browser, mid-tier application, RDBMS, etc.). It should be appreciated that alternate embodiments of a computer system 1900 may have numerous variations from that described above. For example, customized hardware might also be used and/or particular elements might be implemented in hardware, software (including portable software, such as applets) or both. Further, connection to other computing devices such as network input/output devices may be employed. Software of computer system 1900 may include code 1950 for implementing embodiments of the present invention as described herein.

The preceding methods and systems may be implemented by a computer system, such as computer system 1900 in FIG. 19. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

In the preceding description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices were shown in block diagram form.

This description provides exemplary embodiments only, and is not intended to limit the scope, applicability, or configuration of the disclosure. Rather, this description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in this description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data, including non-transitory media. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

What is claimed is:

1. A method for disabling a device associated with a virtual identity, the method comprising:
    receiving, from the device, a request to register an unregistered device, the request associated with an electronic on-line transaction comprising:
        a passcode guess, wherein the passcode guess comprises a digital signature derived from a user-provided passcode; and
        a device identifier;
    determining that the passcode guess does not authorize registration of the unregistered device;
    incrementing a number of incorrect passcode guesses received within a time interval, wherein the incrementing is based on predetermined values for a type of transaction;
    determining that the number of incorrect passcode guesses received within the time interval is greater than or equal to a threshold;
    storing an indication that subsequent requests associated with the device identifier should not register unregistered devices;
    disabling the device associated with the virtual identity based on the receiving, the determining that the passcode guess, the incrementing, the determining that the number of incorrect passcode guesses received, and the storing the indication;
    receiving a request to register a second unregistered device, the request to register the second unregistered device comprising:
        a second passcode guess; and
        the device identifier; and
    denying the request to register the second unregistered device based on the indication.

2. The method of claim 1, further comprising sending the indication that subsequent requests associated with the device identifier should not register unregistered devices to a pairing repository.

3. The method of claim 1, wherein the unregistered device comprises a smart phone.

4. The method of claim 1, wherein the request to register the unregistered device further comprises an encrypted salt value.

5. The method of claim 1, wherein the request to register the unregistered device further comprises a pairing code.

6. The method of claim 1, wherein the unregistered device comprises a laptop computer, a desktop computer, a thin client, a tablet computer, a server, or a personal digital assistant (PDA).

7. The method of claim 1, wherein the time interval is a periodic time interval.

8. The method of claim 7, wherein the periodic time interval is a day or a week.

9. The method of claim 1, wherein the time interval is a sliding time interval measured from a current time.

10. The method of claim 1, wherein the time interval is based on the type of transaction.

11. An identity repository comprising:
one or more interfaces that receive requests from a device;
one or more processors; and
one or more memories communicatively coupled to the one or more processors, having instructions stored thereon, which, when executed by the one or more processors, cause the one or more processors to:
receive a request from the device through the one or more interfaces, the request associated with an electronic on-line transaction comprising:
a passcode guess, wherein the passcode guess comprises a digital signature derived from a user-provided passcode; and
a device identifier;
determine that the passcode guess is incorrect;
increment a number of incorrect passcode guesses received within a time interval, wherein the incrementing is based on predetermined values for a type of transaction;
determine that the number of incorrect passcode guesses received within the time interval is greater than or equal to a threshold;
generate an indication in the one or more memories that subsequent requests associated with the device identifier should not be granted;
disable the device associated based on the receive, the determine that the passcode guess is incorrect, the increment, the determine that the number of incorrect passcode guesses received, and the generate the indication;
receive a request to register a second unregistered device, the request to register the second unregistered device comprising:
a second passcode guess; and
the device identifier; and
deny the request to register the second unregistered device based on the indication.

12. The identity repository of claim 11, wherein the one or more memories further store encrypted personal information associated with a virtual identity, wherein the device identifier is associated with the virtual identity.

13. The identity repository of claim 11, wherein the request from the device comprises a request to use a virtual identity.

14. The identity repository of claim 11, wherein the request from the device comprises a request to pair an unregistered device with a virtual identity.

15. The identity repository of claim 11, wherein the instructions, when executed by the one or more processors, further cause the one or more processors to:
send the indication to a pairing repository that is physically separate from the identity repository.

16. The identity repository of claim 11, wherein the device comprises a laptop computer, a desktop computer, a thin client, a tablet computer, a server, a smart phone or a personal digital assistant (PDA).

17. The identity repository of claim 11, wherein the time interval is a periodic time interval.

18. The identity repository of claim 17, wherein the periodic time interval is a day or a week.

19. The identity repository of claim 11, wherein the time interval is a sliding time interval measured from a current time.

20. The identity repository of claim 11, wherein the time interval is based on the type of transaction.

* * * * *